(12) United States Patent
Li et al.

(10) Patent No.: US 10,719,358 B1
(45) Date of Patent: Jul. 21, 2020

(54) DETERMINING ACTION SELECTION POLICIES OF AN EXECUTION DEVICE

(71) Applicant: Alibaba Group Holding Limited, George Town (KY)

(72) Inventors: Hui Li, Hangzhou (CN); Kailiang Hu, Hangzhou (CN); Le Song, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 0 days.

(21) Appl. No.: 16/712,037

(22) Filed: Dec. 12, 2019

Related U.S. Application Data

(63) Continuation of application No. PCT/CN2019/086975, filed on May 15, 2019.

(51) Int. Cl.
  *G06F 9/48* (2006.01)
  *G06F 16/33* (2019.01)
  *G06F 16/31* (2019.01)
  *G06F 9/30* (2018.01)

(52) U.S. Cl.
  CPC ........ *G06F 9/4881* (2013.01); *G06F 9/30065* (2013.01); *G06F 16/322* (2019.01); *G06F 16/334* (2019.01)

(58) Field of Classification Search
  None
  See application file for complete search history.

(56) References Cited

U.S. PATENT DOCUMENTS

| | | |
|---|---|---|
| 2013/0204412 A1 | 8/2013 | Marecki et al. |
| 2014/0039913 A1 | 2/2014 | Sandholm |
| 2017/0257452 A1 | 9/2017 | Hoiles et al. |
| 2018/0098330 A1 | 4/2018 | Nguyen et al. |
| 2018/0207583 A1 | 7/2018 | Koyanaka |
| 2018/0357554 A1 | 12/2018 | Hazan et al. |
| 2019/0122140 A1 | 4/2019 | Sen |
| 2019/0163515 A1 | 5/2019 | Sekhar Kakaraparthi |
| 2019/0392309 A1 | 12/2019 | Bhatnagar et al. |

OTHER PUBLICATIONS

Lanctot et al., "Monte Carlo Sampling for Regret Minimization in Extensive Games" (Year: 2009).*

(Continued)

*Primary Examiner* — Eric C Wai
(74) *Attorney, Agent, or Firm* — Fish & Richardson P.C.

(57) ABSTRACT

Disclosed herein are methods, systems, and apparatus of an execution device for generating an action selection policy for completing a task in an environment that includes the execution device and one or more other devices. One method includes: in a current iteration, identifying an iterative action selection policy of an action in a state of the execution device in a previous iteration; computing a regret value in the previous iteration based on the iterative action selection policy in the previous iteration; computing an incremental action selection policy in the current iteration based on the regret value in the previous iteration but not any regret value in any iteration prior to the previous iteration; computing an iterative action selection policy in the current iteration based on the iterative action selection policy in the previous iteration and the incremental action selection policy in the current iteration.

21 Claims, 7 Drawing Sheets

(56) References Cited

OTHER PUBLICATIONS

Brown et al., "Deep Counterfactual Regret Minimization" (Year: 2019).*
Johanson et al., "Efficient Nash Equilibrium Approximation through Monte Carlo Counterfactual Regret Minimization" (Year: 2012).*
Gibson et al., "Efficient Monte Carlo Counterfactual Regret Minimization in Games with Many Player Actions" (Year: 2012).*
Brown et al., "Deep counterfactual regret minimization," arXiv preprint arXiv:1811.00164, Nov. 13, 2018, pp. 1-12.
Chen et al., "Utilizing History Information in Acquiring Strategies for Board Game Geister by Deep Counterfactual Regret Minimization," The 24th Game Programming Workshop, 2019, pp. 20-27.
Crosby et al., "BlockChain Technology: Beyond Bitcoin," Sutardja Center for Entrepreneurship & Technology Technica Report, Oct. 16, 2015, 35 pages.
Davis et al., "Low-Variance and Zero-Variance Baselines for Extensive-Form Games," arXiv:1907.09633v1, Jul. 2019, 21 pages.
European Search Report in European Application No. 19789849.7 dated Jan. 8, 2020, 8 pages.
Gibson et al., "Efficient Monte Carlo Counterfactual Regret Minimization in Games with Many Player Actions," Department of Computing Science, University of Alberta, NIPS'12 Proceedings of the 25th International Conference on Neural Information Processing Systems, 2012, 9 pages.
Hu et al., "Online Counterfactual Regret Minimization in Repeated Imperfect Information Extensive Games," Journal of Computer Research and Development, 2014, 51(10): 2160-2170 (with English Abstract).
Johanson et al., "Efficient Nash Equilibrium Approximation through Monte Carlo Counterfacutal Regret Minimization," Conference: Autonomous Agents and Multiagent Systems, May 2012, 8 pages.
Johanson et al., zinkevich.org [online], "Accelerating Best Response Calculation in Large Extensive Games," Jul. 2011, retrieved on Feb. 14, 2020, retrieved from URL<http://martin.zinkevich.org/publications/ijcai2011_rgbr.pdf>, 8 pages.

Lanctot et al., "Monte Carlo Sampling for Regret Minimization in Extensive Games," Advances in Neural Information Processing Systems, 2009, 4 pages.
Li et al., "Double Neural Counterfactual Regret Minimization," Georgia Institute of Technology, 2018, pp. 1-20.
Lisy et al, "Online Monte Carlo Counterfactual Regret Minimization for Search in Imperfect Information Games," International Conference on Autonomous Agents and Multiagent Systems, May 2015, pp. 27-36.
Liu et al., "A Game Theoretic Approach for Attack Prediction," Department of Information Systems, UMBC, 2002, 20 pages.
Nakamoto, "Bitcoin: A Peer-to-Peer Electronic Cash System," www.bitcoin.org, 2005, 9 pages.
Neller et al., "Approximating Optimal Dudo Play with Fixed-Strategy Iteration Counterfacutal Regret Minimization," Advances in Computer Games: 13th International Conference, Jan. 2012, 14 pages.
Schmid et al., "Variance Reduction in Monte Carlo Counterfactual Regret Minimization (VR-MCCFR_ for Extensive Form Games using Baselines," arXiv:1809.03057v1, Sep. 2018, 13 pages.
Teng, "Research on Texas Poker Game Based on Counterfactual Regret Minimization Algorithm," China Masters' Theses Full-text Database, Dec. 2015, 65 pages (with English Abstract).
Meng et al., "Clustering routing algorithm of wireless sensor networks based on Bayesian game," Journal of Systems Engineering and Electronics, 2012, 23(1):154-159.
Zhou et al., "Lazy-CFR: a fast regret minimization algorithm for extensive games with Imperfect Information," Cornell University, 2018, arXiv:1810_04433v2, 10 pages.
Zinkevich et al., "Regret Minimization in Games with Incomplete Information," Neural Information Processing Systems, 2007, 14 pages.
U.S. Appl. No. 16/448,390, Li et al., filed Jun. 21, 2019.
U.S. Appl. No. 16/448,947, Li et al., filed Jun. 21, 2019.
U.S. Appl. No. 16/712,017, Li et al., filed Dec. 12, 2019.
U.S. Appl. No. 16/712,092, Li et al., filed Dec. 12, 2019.
U.S. Appl. No. 16/712,509, Li et al., filed Dec. 12, 2019.

* cited by examiner

```
Algorithm 1: Streamline CFR with Simultaneous Updating
 1 Function SCFR(t,h,π₀,π₁):
 2     i = P(h)
 3     Iᵢ ← Iᵢ(h)
 4     if h ∈ Z then
 5         return [u₀(Iᵢ)∘π₁(Iᵢ), u₁(Iᵢ)∘π₀∘π₁(Iᵢ)]
 6     else if P(h) = -1 then
 7         v ← [0,0]
 8         For a ∈ A(Iᵢ) do
 9             v' ← SCFR(t,ha,π₀,π₁)
10             v ← v + v'σᶜ(a|Iᵢ)
11         return v
12     else
13         v ← [0,0], v^t(·|Iᵢ) ← 0, r^t(·|Iᵢ) ← 0
14         For a ∈ A(Iᵢ) do
15             if i = 0 then
16                 v' ← SCFR(t,ha,π₀σ₀ᵗ(a|I₀),π₁)
17                 v^t(a|Iᵢ) ← v'[0]
18                 v ← v + [v'[0]σ₀ᵗ(a|Iᵢ), v'[1]]
19             else
20                 v' ← SCFR(t,ha,π₀,π₁σ₁ᵗ(a|Iᵢ))
21                 v^t(a|Iᵢ) ← v'[1]
22                 v ← v + [v'[0], v'[1]σ₁ᵗ(a|Iᵢ)]
23         For a ∈ A(Iᵢ) do
24             r^t(a|Iᵢ) ← v^t(a|Iᵢ) - v[i]
25             σᵢ(Iᵢ) ← CalculateStrategy(r^t(·|Iᵢ),Iᵢ)
26             σᵢᵗ⁺¹(Iᵢ) ← (1 - α(t))σᵢᵗ(Iᵢ) + α(t)σᵢ(Iᵢ)
27         return v
28
29 Function CalculateStrategy(Rᵢ(·|Iᵢ),Iᵢ):
30     sum ← Σ_{a∈A(Iᵢ)} max(Rᵢ(a|Iᵢ), 0)
31     For a ∈ A(Iᵢ) do
32         σᵢ(a|Iᵢ) = max(Rᵢ(a|Iᵢ),0)/sum if sum > 0 else 1/|A(Iᵢ)|
33     return σᵢ(Iᵢ)
34
```

FIG. 3

DETERMINING ACTION SELECTION POLICIES OF AN EXECUTION DEVICE

CROSS-REFERENCE TO RELATED APPLICATIONS

This application is a continuation of PCT Application No. PCT/CN2019/086975, filed on May 15, 2019, which is hereby incorporated by reference in its entirety.

TECHNICAL FIELD

This specification relates to determining action selection policies for an execution device for completing a task in an environment that includes the execution device and one or more other devices.

BACKGROUND

Strategic interaction between two or more parties can be modeled by a game that involves two or more parties (also referred to as players). In an Imperfect Information Game (IIG) that involves two or more players, a player only has partial access to the knowledge of her opponents before making a decision. This is similar to real-world scenarios, such as trading, traffic routing, and public auction. Many real life scenarios can be represented as IIGs, such as commercial competition between different companies, bidding relationships in auction scenarios, game relationships between a fraud party and an anti-fraud party.

Methods for solving an IIG are of great economic and societal benefits. Due to the hidden information, a player has to reason under the uncertainty regarding her opponents' information, and she also needs to act so as to take advantage of her opponents' uncertainty regarding her own information.

SUMMARY

This specification describes technologies for determining an action selection policy for an execution device for completing a task in an environment that includes the execution device and one or more other devices, for example, for strategic interaction between the execution device and the one or more other devices. For example, the execution device can perform a computer-implemented method for searching for a Nash equilibrium of a game between the execution device and one or more other devices. In some embodiments, these technologies can involve performing a streamline counterfactual regret minimization (CFR) algorithm for solving an imperfect information game (IIG), which can save memory space, reduce the computational complexity and variance, while improving the convergence speed of the CFR algorithm.

This specification also describes one or more non-transitory computer-readable storage media coupled to one or more processors and having instructions stored thereon which, when executed by the one or more processors, cause the one or more processors to perform operations in accordance with embodiments of the methods provided herein.

This specification further describes a system for implementing the methods described herein. The system includes one or more processors, and a computer-readable storage medium coupled to the one or more processors having instructions stored thereon which, when executed by the one or more processors, cause the one or more processors to perform operations in accordance with embodiments of the methods provided herein.

Methods, systems, and computer media in accordance with this specification may include any combination of the aspects and features described herein. That is, methods in accordance with this specification are not limited to the combinations of aspects and features specifically described herein, but also include any combination of the aspects and features described.

The details of one or more embodiments of this specification are set forth in the accompanying drawings and the description below. Other features and advantages of this specification will be apparent from the description and drawings, and from the claims.

BRIEF DESCRIPTION OF THE DRAWINGS

FIG. 3 is a pseudocode of an example of a streamline CFR algorithm, in accordance with embodiments of this specification.

Like reference numbers and designations in the various drawings indicate like elements.

DETAILED DESCRIPTION

Figure 1:
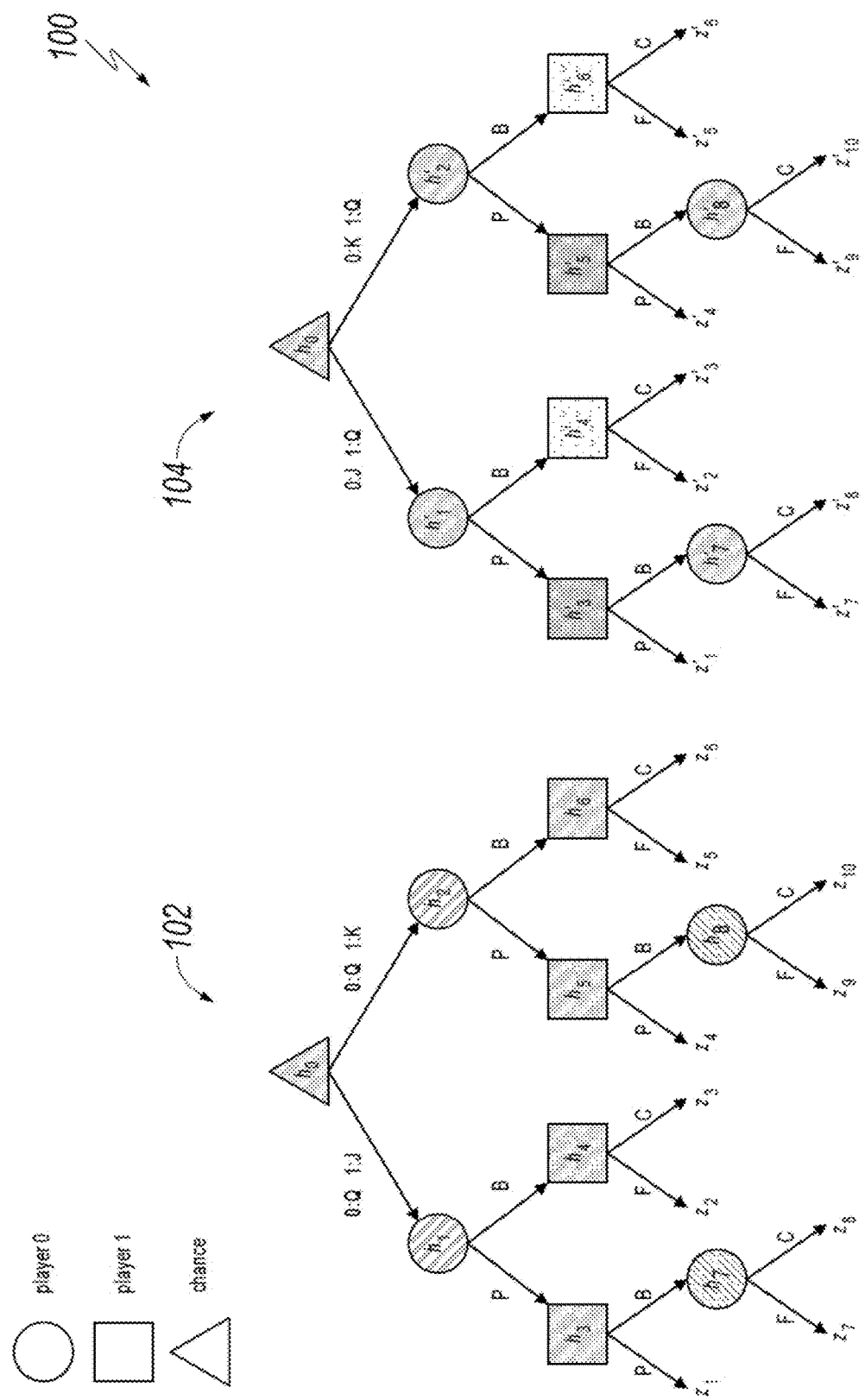
FIG. 1 is a diagram illustrating examples of partial game trees in one-card poker, in accordance with embodiments of this specification.

This specification describes technologies for determining an action selection policy for an execution device for completing a task in an environment that includes the execution device and one or more other devices, for example, for strategic interaction between the execution device and the one or more other devices. For example, the execution device can perform a computer-implemented method for searching for a Nash equilibrium of a game between the execution device and one or more other devices. In some embodiments, these technologies can involve performing a streamline counterfactual regret minimization (CFR) algorithm for solving an imperfect information game (IIG), which can save memory space, reduce the computational complexity and variance, while improving the convergence speed of the CFR algorithm.

An IIG can represent one or more real-world scenarios such as resource allocation, product/service recommendation, cyber-attack prediction and/or prevention, traffic routing, fraud management, that involve two or more parties (also referred to as players), where each party may have incomplete or imperfect information about the other party's decisions.

Nash equilibrium is a typical solution for an IIG that involves two or more players. Counterfactual Regret Minimization (CFR) is an algorithm designed to approximately find Nash equilibrium for large games. CFR tries to minimize overall counterfactual regret. It is proven that the average of the strategies in all iterations would converge to a Nash equilibrium. When solving a game, CFR in its original form (also referred to as original CFR, standard CFR, vanilla CFR, or simply, CFR) traverses the entire game tree in each iteration. Thus, the original CFR requires large memory for large, zero-sum extensive games such as heads-up no-limit Texas Hold'em. In some instances, the original CFR may not handle large games with limited memory.

A Monte Carlo CFR (MCCFR) was introduced to minimize counterfactual regret. The MCCFR can compute an unbiased estimation of counterfactual value and avoid traversing the entire game tree. Since only subsets of all information sets are visited in each iteration, MCCFR requires less memory than the original CFR.

MCCFR can be performed with an outcome sampling algorithm or an external sampling algorithm. The outcome sampling algorithm in MCCFR has a large variance, and it is difficult to converge to an approximate Nash equilibrium solution in fewer iteration steps. The external sampling algorithm in MCCFR has a smaller variance than the outcome sampling algorithm, but this method presents similar disadvantages to CFR. When the game tree is large, it requires a very large memory space and cannot be extended to a complex large-scale IIG.

This specification discloses a streamline CFR algorithm. Compared to original CFR algorithm, in some embodiments, the space complexity of streamline CFR algorithm is about half of that of the original CFR algorithm. In some embodiments, the streamline CFR algorithm only needs one tabular memory or a single neutral network to track the key information while converging to comparable results produced by original CFR. The disclosed streamline CFR algorithm can be used in large games even with memory constraints. In some embodiments, the described techniques can be used, for example, in AI poker, recommendation platforms, and many other applications that can be modeled by a game that involves two or more parties.

In some embodiments, an extensive-form game with a finite set $N=\{0, 1, \ldots, n-1\}$ of players can be represented as follows: define $h^v_i$ as a hidden variable of player i in an IIG. For example, in a poker game, $h^v_i$ can refer to the private cards of player i. H refers to a finite set of histories. Each member $h=(h_i^v)_{i=0, 1, \ldots, n-1}(a_l)_{l=0, \ldots, L-1} = h_0'h_1' \ldots h_{n-1}'a_0a_1 \ldots a_{L-1}$ of H denotes a possible history (or state), which includes each player's hidden variable and L actions taken by players including chance. For player i, h also can be denoted as $h_i'h_{-i}'a_0a_1 \ldots a_{L-1}$, where $h_{-i}^v$ refers to the opponent's hidden variables. The empty sequence Ø is a member of H. The expression $h_j \sqsubseteq h$ denotes that $h_j$ is a prefix of h, where $h_j=(h_i^v)_{i=0, 1, \ldots, n-1}(a_l)_{l=1, \ldots, L'-1}$ and $0<L'<L$. $Z \subseteq H$ denotes the terminal histories and any member $z \in Z$ is not a prefix of any other sequences. $A(h)=\{a:ha \in H\}$ is the set of available actions after non-terminal history $h \in H \backslash Z$. A player function P assigns a member of $N \cup \{c\}$ to each non-terminal history, where c denotes the chance player identifier (ID), which typically can be, for example, −1. P(h) is the player who takes an action after history h.

L of a history $\{h \in H:P(h)=i\}$ is an information partition of player i. A set $I_i \in \mathcal{I}_i$ is an information set of player i. $I_i(h)$ refers to information set $I_i$ at state h. In some embodiments, $I_i$ could only remember the information observed by player i including player i's hidden variable and public actions. Therefore $I_i$ indicates a sequence in the IIG, i.e., $h^v_i, a_0a_2 \ldots a_{L-1}$. In some embodiments, for $I_i \in \mathcal{I}_i$ and for any $h \in I_i$, the set A(h) can be denoted by $A(I_i)$ and the player P(h) is denoted by $P(I_i)$. For each player $i \in N$, a utility function $u_i(z)$ defines a payoff of a terminal state z. A more detailed explanation of these notations and definitions will be discussed below and will include an example shown in FIG. 1.

FIG. 1 is a diagram 100 illustrating examples of partial game trees 102 and 104 in One-Card Poker, in accordance with embodiments of this specification. One-Card Poker is a two-player IIG of poker. One-Card Poker is an example of an extensive-form game. The game rules are defined as follows. Each player is dealt one card from a deck of X cards. The first player can pass or bet. If the first player bets, the second player can call or fold. If the first player passes, the second player can pass or bet. If second player bets, the first player can fold or call. The game ends with two passes, a call, or a fold. The folding player will lose 1 chip. If the game ended with two passes, the player with the higher card wins 1 chip. If the game ends with a call, the player with the higher card wins 2 chips.

A game tree is a directed graph. The nodes of the game tree represent positions (or states of a player) in a game and of the game tree represent can represent moves or actions of a player of the game. In FIG. 1, $z_i$ denotes a terminal node, representing a terminal state, and $h_i$ denotes a non-terminal node. Each of the partial game trees 102 and 104 has a root node $h_0$ representing a chance. There are 19 distinct nodes in the first partial game tree 102, corresponding to 9 non-terminal nodes A including chance $h_0$ and 10 terminal nodes $z_i$ in the left tree.

In the first partial game tree 102, two players (player 0 and player 1) are dealt (queen, jack) as shown as "0:Q 1:J" in the left subtree and (queen, king), as shown as "0:Q 1:K" in the right subtree.

The trajectory from the root node to each node is a history of actions. Actions are represented by letters (e.g., F, C, P, and B) or representations (e.g., "0:Q 1:J") next to edges (denoted by arrows) of the game tree. The letters F, C, P, B refer to fold, call, pass, and bet, respectively.

In an extensive-form game, $h_i$ refers to the history of actions. For example, as illustrated in the first partial game tree 102, $h_3$ includes actions 0:Q, 1:J and P. $h_7$ includes actions 0:Q, 1:J, P and B. $h_8$ includes actions 0:Q, 1:K, P and B. In the first partial game tree 102, $h_3 \sqsubseteq h_7$, that is, $h_3$ is a prefix of $h_7$. $A(h_3)=\{P,B\}$ indicating that the set of available actions after non-terminal history $h_7$ are P and B. $P(h_3)=1$ indicating that the player who takes an action after history $h_3$ is player 1.

In the IIG, the private card of player 1 is invisible to player 0, therefore $h_7$ and $h_8$ are actually the same for player 0. An information set can be used to denote the set of these undistinguished states. Similarly, $h_1$ and $h_2$ are in the same information set. For the right partial game tree 104, $h'_3$ and $h'_5$ are in the same information set; $h'_4$ and $h'_6$ are in the same information set.

Typically, any $I_i \in \mathcal{I}$ could only remember the information observed by player i including player i's hidden variables and public actions. For example, as illustrated in the first partial game tree 102, the information set of $h_7$ and $h_8$ indicates a sequence of 0:Q, P, and B. Because $h_7$ and $h_8$ are undistinguished by player 0 in the IIG, if $I_0$ is the information set of $h_7$ and $h_8$, $I_0=I_0(h_7)=I_0(h_8)$.

A strategy profile $\sigma=\{\sigma_i|\sigma \in \Sigma_i, i \in N\}$ is a collection of strategies for all players, where $\Sigma_i$ is the set of all possible strategies for player i. $\sigma_{-i}$ refers to strategy of all players other than player i. For player $i \in N$, the strategy $\sigma_i(I_i)$ is a function, which assigns an action distribution over $A(I_i)$ to information set $I_i$. $\sigma_i(a|h)$ denotes the probability of action a taken by player $i \in N \cup \{c\}$ at state h. In an IIG, if two or more states have the same information set, the two or more states have a same strategy. That is, $\forall h_1, h_2 \in I_i = I_i(h_1) = I_i(h_2)$, $\sigma_i(I_i) = \sigma_i(h_1) = \sigma_i(h_2)$, $\sigma_i(a|I_i) = \sigma_i(a|h_1) = \sigma_i(a|h_2)$. For example, his the information set of $h_7$ and $h_8$, $I_0 = I_0(h_7) = I_0(h_8)$, $\sigma_0(I_0) = \sigma_0(h_7) = \sigma_0(h_8)$, $\sigma_0(a|I_0) = \sigma_0(a|h_7) = \sigma_0(a|h_8)$. In FIG. 1, the same shading (other than the gray ones) is used to represent the same information set in respective state.

For player i, the expected game utility of the strategy profile $\sigma$ is denoted as $u_i^\sigma = \Sigma_{z \in Z} \pi^\sigma(z) u_i(z)$, which is the expected payoff of all possible terminal nodes. Given a fixed strategy profile $\sigma_{-i}$, any strategy $\sigma_i^* = \arg\max_{\sigma'_i \in \Sigma_i} u_i^{(\sigma'_i, \sigma_{-i})}$ of player i that achieves maximize payoff against $\pi_{-i}^\sigma$ is a best response. For two players' extensive-form games, a Nash equilibrium is a strategy profile $\sigma^* = (\sigma_0^*, \sigma_1^*)$ an such that each player's strategy is a best response to the opponent. An $\epsilon$-Nash equilibrium is an approximation of a Nash equilibrium, whose strategy profile $\sigma^*$ satisfies: $\forall_i \in N$, $u_i^{\sigma_i} + \epsilon \geq \max_{\sigma'_i \in \Sigma_i} u_i^{(\sigma'_i, \sigma_{-i})}$.

Exploitability of a strategy $\sigma_i$ can be defined as $\epsilon_i(\sigma_i) = u_i^{\sigma^*} - u_i^{(\sigma_i, \sigma^*_{-i})}$. A strategy is unexploitable if $\epsilon_i(\sigma_i) = 0$. In large two player zero-sum games such as poker, $u_i^{\sigma^*}$ can be intractable to compute. However, if the players alternate their positions, the value of a pair of games is zero, i.e., $u_0^{\sigma^*} + u_1^{\sigma^*} = 0$. The exploitability of strategy profile a can be defined as $\in(\sigma) = (u_1^{(\sigma_0, \sigma_1^*)} + u_0^{(\sigma_0^*, \sigma_1)})/2$.

For iterative methods such as CFR, $\sigma^t$ can refer to the strategy profile at the t-th iteration. The state reach probability of history h can be denoted by $\sigma^\sigma(h)$ if players take actions according to $\sigma$. For an empty sequence $\pi^\sigma(\emptyset) = 1$. The reach probability can be decomposed into $\pi^\sigma(h) = \Pi_{i \in N \cup \{c\}} \pi_i^\sigma(h) = \pi_i^\sigma(h) \pi_{-i}^\sigma(h)$ according to each player's contribution, where $\pi_i^\sigma(h) = \Pi_{h'a \subseteq h, P(h') = P(h')} \sigma_i(a|h')$ and $\pi_{-i}^\sigma(h) = \Pi_{h'a \subseteq h, P(h') \neq P(h')} \sigma_{-i}(a|h')$.

The reach probability of information set $I_i$ (also referred to as information set reach probability) can be defined as $\pi^\sigma(I_i) = \Sigma_{h \in I_i} \pi^\sigma(h)$. If $h' \subseteq(h)$. If the interval state reach probability from state h' to h can be defined as $\pi^\sigma(h', h)$, then $\pi^\sigma(h', h) = \pi^\sigma(h)/\pi^\sigma(h')$. The reach probabilities $\pi_i^\sigma(I_i)$, $\pi_{-i}^\sigma(I_i)$, $\pi_i^\sigma(h', h)$, and $\pi_{-i}^\sigma(h', h)$ can be defined similarly.

In large and zero-sum IIGs, CFR is proved to be an efficient method to compute Nash equilibrium. It is proved that the state reach probability of one player is proportional to posterior probability of the opponent's hidden variable, i.e., $p(h_{-i}^v | I_i) \propto \pi_{-i}^\sigma(h)$, where $h_{-i}^v$ and $I_i$ indicate a particular h.

For player i and strategy profile $\sigma$, the counterfactual value (CFV) $v_i^\sigma(h)$ at state h can be define as $$v_i^\sigma(h) = \Sigma_{h \subseteq z, z \in Z} \pi_{-i}^\sigma(h) \pi^\sigma(h, z) u_i(z) = \Sigma_{h \subseteq z, z \in Z} \pi_i^\sigma(h, z) u'_i(z) \quad (1)$$

where $u'_i(z) = \pi_{-1}^\sigma(z) u_i(z)$ is the expected reward of player i with respect to the approximated posterior distribution of the opponent's hidden variable. Then the counterfactual value of information set $I_i$ is $v_i^\sigma(I_i) = \Sigma_{h \in I_i} v_i^\sigma(h)$.

The action counterfactual value of taking action a can be denoted as $v_i^\sigma(a|h) = v_i^\sigma(ha)$ and the regret of taking this action is $$r_i^\sigma(a|h) = v_i^\sigma(a|h) - v_i^\sigma(h). \quad (2)$$

Similarly, the CFV of information set $I_i$ can be defined as $v_i^\sigma(I_i) = \Sigma_{h \in I_i} v_i^\sigma(h)$ while the CFV of its action a is $v_i^\sigma(a|I_i) = \Sigma_{z \in Z, h \subseteq z, h \in I_i} \pi_i^\sigma(h, z) u'_i(z)$ and the regret of action a given the information set $l_i$ can be defined as $$r_i^\sigma(a|I_i) = v_i^\sigma(a|I_i) - v_i^\sigma(I_i) = \Sigma_{z \in Z, ha \subseteq z, h \in I_i} \pi_i^\sigma(ha, z) u'_i(z) - \Sigma_{z \in Z, h \subseteq z, h \in I_i} \pi_i^\sigma(h, z) u'_i(z), \quad (3)$$

where $$u_i^\sigma(I_i) = \frac{\sum_{h \in I_i} v_i^\sigma(h)}{\sum_{h \in I_i} \pi_{-i}^\sigma(h)} = \frac{\sum_{h \in I_i} v_i^\sigma(h)}{\pi_{-i}^\sigma(I_i)}.$$

Note that, in imperfect information game, $\pi_{-i}^\sigma(I_i) = \sigma_{-i}^\sigma(h)$.

Then, the cumulative regret of action a after T iterations can be calculated according to Eq. (4):

$$R_i^T(a|I_i) = \sum_{t=1}^{T} \left( v_i^{\sigma^t}(a|I_i) - v_i^{\sigma^t}(I_i) \right) = R_i^{T-1}(a|I_i) + r_i^{\sigma^T}(a|I_i) \quad (4)$$

where $R_i^0(a|I_i) = 0$. Define $R_i^{T,+}(a|I_i) = \max(R_i^T(a|I_i), 0)$, the current strategy (or iterative strategy or behavior strategy) at T+1 iteration can be updated, for example, based on regret matching (RM), according to Eq. (5) below:

$$\sigma_i^{T+1}(a|I_i) = \begin{cases} \dfrac{R_i^{T,+}(a|I_i)}{\sum_{a \in A(I_i)} R_i^{T,+}(a|I_i)}, & \text{if } \sum_{a \in A(I_i)} R_i^{T,+}(a|I_i) > 0 \\ \dfrac{1}{|A(I_i)|}, & \text{otherwise} \end{cases} \quad (5)$$

The average strategy $\bar{\sigma}_i^T$ from iteration 1 to T can be defined as:

$$\bar{\sigma}_i^T(a|I_i) = \frac{\sum_{t=1}^{T} \pi_i^{\sigma^t}(I_i) \sigma_i^t(a|I_i)}{\sum_{t=1}^{T} \pi_i^{\sigma^t}(I_i)} \quad (6)$$

where $\sigma_i^{\sigma^t}(I_i)$ denotes the information set reach probability of $I_i$ at t-th iteration and is used to weigh the corresponding current strategy $\sigma_i^t(a|I_i)$.

If $s^t(a|I_i) = \pi_i^{\sigma^t}(I_i) \sigma_i^t(a|I_i)$ is defined as an additional numerator in iteration t, then the cumulative numerator of the average strategy $\bar{\sigma}_i^T$ can be defined as $$S^T(a|I_i) = \sum_{t=1}^{T} \pi_i^{\sigma^t}(I_i) \sigma_i^t(a|I_i) = S^{T-1}(a|I_i) + s_i^T(a|I_i), \quad (7)$$

where $S^0(a|I_i) = 0$.

For the streamline CFR, unlike the iterative strategy $\sigma_i^{T+1}(a|I_i)$ in the original CFR, an incremental strategy $\tilde{\sigma}_i^{t+1}(a|I_i)$ is defined as in Eq. (8):

$$\tilde{\sigma}_i^{t+1}(a|I_i) = \begin{cases} \dfrac{\tilde{R}_i^{t,+}(a|I_i)}{\sum_{a \in A(I_i)} \tilde{R}_i^{t,+}(a|I_i)}, & \text{if } \sum_{a \in A(I_i)} \tilde{R}_i^{t,+}(a|I_i) > 0 \\ \dfrac{1}{|A(I_i)|}, & \text{otherwise} \end{cases} \quad (8)$$

wherein $\check{R}^t(a|I_i)=r_i^{\sigma^t}(a|I_i)$, and $\check{\sigma}^1=(\check{\sigma}_i^1, \check{\sigma}_{-i}^1)$ is an initial strategy, for example, initialized by a random policy, such as a uniform random strategy profile, or another initialization policy.

The iterative strategy of the streamline CFR in iteration t can be defined by Eq. (9):

$$\sigma_i^T(a|I_i)=(1-\alpha^t(I_i))\sigma_i^{t-1}(a|I_i)+\alpha^t(I_i)\check{\sigma}_i^t(a|I_i) \quad (9)$$

where $\alpha^t(L)$ is the learning rate for $I_i$ in t-th iteration and $\sigma_i^0(a|I_i)=0$. The learning rate $\alpha^t(I_i)$ approaches 0 as t approaches infinity. As an example, $\alpha^t(I_i)$ can be set as 1/t or another value. With Eq. (9), the iterative strategy in the next iterations can be obtained. After enough iterations, the iterative strategy profile $\sigma_i^T(a|I_i)$ obtained by the streamline CFR can converge to an approximated Nash equilibrium. It is proved that the iterative strategy profile defined by Eq. (9) can converge to a set of Nash equilibria in two-player zero-sum games.

When solving a game, the original CFR traverses the entire game tree in each iteration. Thus, the original CFR may not handle large games with limited memory. A Monte Carlo CFR (MCCFR) was introduced to minimize counterfactual regret. The MCCFR can compute an unbiased estimation of counterfactual value and avoid traversing the entire game tree. Since only subsets of all information sets are visited in each iteration, MCCFR requires less memory than the original CFR.

For example, define $Q=\{Q_1, Q_2, \ldots, Q_m\}$, where $Q_j \in Z$ is a block of sampling terminal histories in each iteration, such that Q spans the set Z. Generally, different $Q_j$ may have an overlap according to a specified sampling scheme. Several sampling schemes can be used.

Figure 2A:
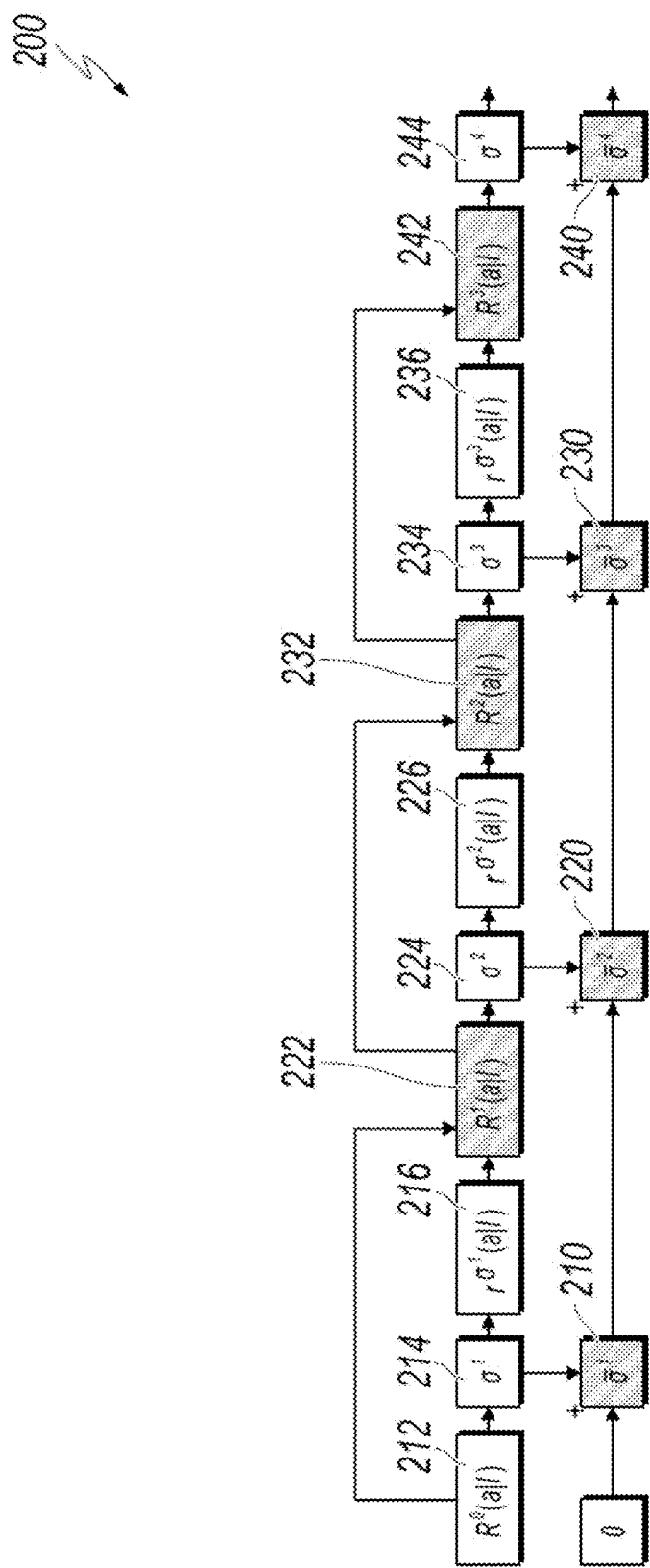
FIG. 2A is a diagram illustrating an example of a workflow of original CFR and streamline CFR.
Figure 2B:
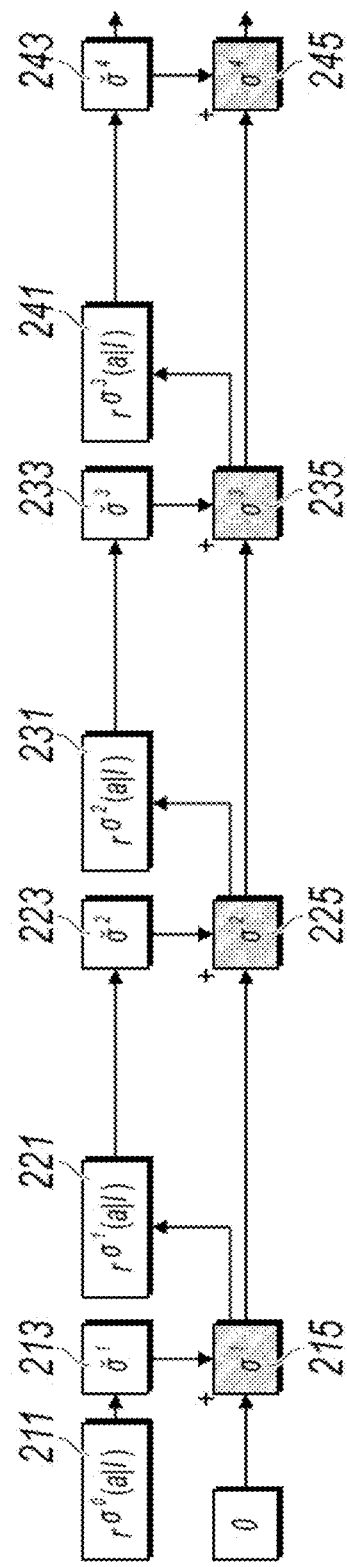
FIG. 2B illustrates an example of a workflow of streamline CFR, in accordance with embodiments of this specification.

FIG. 2A is a diagram illustrating an example of a workflow 200 of original CFR and streamline CFR, and FIG. 2B illustrates an example of a workflow 205 of streamline CFR, in accordance with embodiments of this specification. As illustrated, both the original CFR and the streamline CFR can be performed in an iterative manner. FIGS. 2A and B show four iterations, t=1, 2, 3 or 4, respectively. The superscript 1, 2, 3, or 4 represent the t-th iteration. The original CFR and the streamline CFR can include more iterations. To simplify the expression, the subscript i is omitted under each of $R_i^t(a|I_i)$, $\sigma_i^t(a|I_i)$, $\sigma_i^t(a|I_i)$, and $r_i^{\sigma_i^t}(a|I_i)$.

As illustrated in the workflow 205 of the streamline CFR in FIG. 2B, in the first iteration, t=1, an incremental strategy $\check{\sigma}^1(a|I)$ 213 can be computed based on an initial regret value $r^{\sigma^0}(a|I)$ 211, for example, according to Eq. (8). The iterative strategy $\sigma^1(a|I)$ 215 can be computed based on the incremental strategy $\check{\sigma}^1(a|I)$ 213 and an initial iterative strategy $\sigma^0(a|I)=0$, for example, according to Eq. (9). Based on the iterative strategy $\sigma^1(a|I)$ 215, an updated regret value of the iterative strategy of $r^{\sigma^1}(a|I)$ 221 can be computed, for example, according to Eq. (3) based on the counterfactual values by traversing the game tree recursively.

The updated regret value of the iterative strategy of $r^{\sigma^1}(a|I)$ 221 can be used to compute an updated incremental strategy $\check{\sigma}^2(a|I)$ 223 in the next iteration, t=2, for example, according to Eq. (8). The iterative strategy $\sigma^2(a|I)$ 225 can be computed based on the incremental strategy $\check{\sigma}^2(a|I)$ 223 and the iterative strategy $\sigma^1(a|I)$ 215 in the first iteration, for example, according to Eq. (9). Similarly, based on the iterative strategy $\sigma^2(a|I)$ 225, an updated regret value $r^{\sigma^2}(a|I)$ 231 of the iterative strategy $\sigma^2(a|I)$ 225 can be computed, for example, according to Eq. (3) based on the counterfactual values by traversing the game tree recursively.

Similarly, in the next iteration, t=3, based on the updated regret value $r^{\sigma^2}(a|I)$ 231, an updated incremental strategy $\check{\sigma}^3(a|I)$ 233 can be computed, for example, according to Eq. (8). An iterative strategy $\sigma^3(a|I)$ 235 can be computed based on the incremental strategy $\check{\sigma}^3(a|I)$ 233 and the iterative strategy $\sigma^2(a|I)$ 225, for example, according to Eq. (9). Based on the iterative strategy $\sigma^3(a|I)$ 235, an updated regret value $r^{\sigma^3}(a|I)$ 241 of the iterative strategy $\sigma^3(a|I)$ 235 can be computed, for example, according to Eq. (3) based on the counterfactual values by traversing the game tree recursively.

In the next iteration, t=4, based on the updated regret value $r^{\sigma^3}(a|I)$ 241, an updated incremental strategy $\check{\sigma}^4(a|I)$ 243 can be computed, for example, according to Eq. (8). An iterative strategy $\sigma^4(a|I)$ 245 can be computed based on the incremental strategy $\check{\sigma}^4(a|I)$ 244 and the iterative strategy $\sigma^3(a|I)$ 235, for example, according to Eq. (9). Based on the iterative strategy $\sigma^4(a|I)$ 245, an updated regret value $r^{\sigma^5}(a|I)$ (not shown) of the iterative strategy $\sigma^4(a|I)$ 245 can be computed, for example, according to Eq. (4) based on the counterfactual values by traversing the game tree recursively. The updated regret value $r^{\sigma^5}(a|I)$ can be used for computing an incremental strategy for the next iteration. The streamline CFR can repeat the above iterations until convergence is achieved.

Note that in the streamline CFR, as illustrated in FIG. 2B, an incremental strategy in a current iteration (e.g., $\check{\sigma}^T(a|I)$ in the T-th iteration) can be computed based on a regret value of the action in an immediately previous iteration (e.g., $r^{\sigma^{T-1}}(a|I)$ in the (T-1)th iteration) but not any regret value of the action in any other previous iteration (e.g., (T-2)th iteration, (T-3)th iteration). And the iterative strategy in a current iteration (e.g., $\sigma^T(a|I)$ in the T-th iteration) can be computed based on the iterative strategy of the action in the (T-1)-th iteration (e.g., $\sigma^{T-1}(a|I)$ in the (T-1)-th iteration) and the incremental strategy of the action in the current iteration (e.g., $\check{\sigma}^T(a|I)$ in the t-th iteration). As such, only the iterative strategy in the current iteration (e.g., $\sigma^T(a|I)$ in the T-th iteration) needs to be stored for computing an updated iterative strategy in the next iteration (e.g., $\sigma^{T+1}(a|I)$ in the (T+1)-th iteration). This is in contrast to the original CFR. For example, for a current iteration (e.g., T-th iteration), the original CFR proceeds based on a cumulative regret $R_i^T(a|I_i)$ and average strategy $\bar{\sigma}_i^T$ over all t=1, 2, …, T iterations.

As illustrated in the workflow 200 of the original CFR in FIG. 2A, in the first iteration, t=1, an iterative strategy $\sigma^1(a|I)$ 214 can be computed based on an initial accumulative regret $R^0(a|I_i)$ 212, for example, according to Eq. (5). An average strategy $\bar{\sigma}^1(a|I)$ 210 can be computed based on the iterative strategy $\sigma^1(a|I)$ 214 and an initial average strategy $\sigma^0(a|I)=0$, for example, according to Eq. (6). Based on the iterative strategy $\sigma^1(a|I)$ 214, an updated regret value of the iterative strategy of $r^{\sigma^1}(a|I)$ 216 can be computed, for example, according to Eq. (3) based on the counterfactual values by traversing the game tree recursively. An updated accumulative regret $R^1(a|I)$ 222 of action a after the first iteration can be computed based on the iterative strategy of $r^{\sigma^1}(a|I)$ 216 and the initial accumulative regret $R^0(a|I)$ 212, for example, according to Eq. (4).

In the second iteration, t=2, an iterative strategy $\sigma^2(a|I)$ 224 can be computed based on the updated accumulative regret $R^1(a|I)$ 222, for example, according to Eq. (5). An average strategy $\bar{\sigma}^2(a|I)$ 220 can be computed based on the iterative strategy $\sigma^2(a|I)$ 224 and the average strategy $\bar{\sigma}^1(a|I)$ 210 in the first iteration, for example, according to Eq. (6). Based on iterative strategy $\sigma^2(a|I)$ 224, an updated regret value of the iterative strategy of $r^{\sigma^2}(a|I)$ 226 can be computed, for example, according to Eq. (3) based on the counterfactual values, by traversing the game tree recursively. An updated accumulative regret $R^2(a|I)$ 232 of action a after the second iteration can be computed based on the iterative strategy of $r^{\sigma^2}(a|I)$ 226 and the accumulative regret $R^1(a|I)$ 222, for example, according to Eq. (4).

In the third iteration, t=3, an iterative strategy $\sigma^3(a|I)$ 234 can be computed based on the updated accumulative regret $R^2(a|I)$ 232, for example, according to Eq. (5). An average strategy $\bar{\sigma}^3(a|I)$ 230 can be computed based on the iterative strategy $\sigma^3(a|I)$ 234 and the average strategy $\bar{\sigma}^2(a|I)$ 220 in the second iteration, for example, according to Eq. (6). Based on iterative strategy $\sigma^3(a|I)$ 234, an updated regret value of the iterative strategy of $r^{\sigma^3}(a|I)$ 236 can be computed, for example, according to Eq. (3) based on the counterfactual values, by traversing the game tree recursively. An updated accumulative regret $R^3(a|I)$ 242 of action a after the third iteration can be computed based on the iterative strategy of $r^{\sigma^3}(a|I)$ 236 and the accumulative regret $R^2(a|I)$ 232, for example, according to Eq. (4).

In the fourth iteration, t=4, an iterative strategy $\sigma^4(a|I)$ 244 can be computed based on the updated accumulative regret $R^3(a|I)$ 242, for example, according to Eq. (5). An average strategy $\bar{\sigma}^4(a|I)$ 240 can be computed based on the iterative strategy $\sigma^4(a|I)$ 244 and the average strategy $\bar{\sigma}^3(a|I)$ 230 in the third iteration, for example, according to Eq. (6). Based on iterative strategy $\sigma^4(a|I)$ 244, an updated regret value of the iterative strategy of $r^{\sigma^4}(a|I)$ (not shown) can be computed, for example, according to Eq. (3) based on the counterfactual values, by traversing the game tree recursively. Similarly, an updated accumulative regret $R^4(a|I)$ (not shown) of action a after the fourth iteration can be computed based on the iterative strategy of $r^{\sigma^4}(a|I)$ and the accumulative regret $R^3(a|I)$ 242, for example, according to Eq. (4). The original CFR can repeat the above iterations until convergence is achieved.

As illustrated in the workflow 200 of the original CFR in FIG. 2A, the original CFR needs to track at least two values in each iteration, that is, the cumulative regret $R_i^T(a|I_i)$ and the average strategy $\bar{\sigma}_i^T$ over all t=1, 2, ..., T iterations, as each iteration of the original CFR relies not only on the regret and strategy of the immediately preceding iteration but also on those in all iterations prior to the immediately preceding iteration. On the other hand, each iteration of the streamline CFR can proceed without the knowledge of any regret values or strategies in any iteration prior to the immediately preceding iteration (e.g., (T−2)th iteration, (T−3)th iteration). For example, the streamline CFR may only need to store the iterative strategies (e.g., $\sigma^1(a|I)$ 215, $\sigma^2(a|I)$ 225, $\sigma^3(a|I)$ 235, $\sigma^4(a|I)$ 245) as shown as gray blocks in FIG. 2A), whereas the original CFR needs to store accumulative regrets (e.g., $R^0(a|I)$ 212, $R^1(a|I)$ 222, $R^2(a|I)$ 232 and $R^3(a|I)$ 242) as well as average strategies (e.g., $\bar{\sigma}^1(a|I)$ 210, $\bar{\sigma}^2(a|I)$ 220, $\bar{\sigma}^3(a|I)$ 230, and $\bar{\sigma}^4(a|I)$ 240 as shown as gray blocks in FIG. 2B) in each iteration. As such, the streamline CFR requires less storage space than the original CFR (e.g., half of the storage space), providing improved memory efficiency.

FIG. 3 is a pseudocode 300 of an example of a streamline CFR algorithm, in accordance with embodiments of this specification. In some embodiments, a streamline CFR algorithm is an iterative algorithm. Within each iteration t, a function SCFR is called for player 0 and player 1 to update an incremental strategy $\tilde{\sigma}_i(I_i)$ and an iterative strategy $\sigma_i^{t+1}(I_i)$ as shown in lines 25 and 26 of the pseudocode 300, respectively. The incremental strategy $\tilde{\sigma}_i(I_i)$ is updated using a function CalculateStrategy as defined in lines 29-33 of the pseudocode 300. The function CalculateStrategy is an example implementation of Eq. (8). The iterative strategy $\sigma_{i[}^{t+1}(I_i)$ can be updated according to Eq. (9). The function SCFR returns the counterfactual value of each information set as the output, which is computed by traversing the game tree recursively as shown in lines 4-27 of the pseudocode 300.

Figure 4:
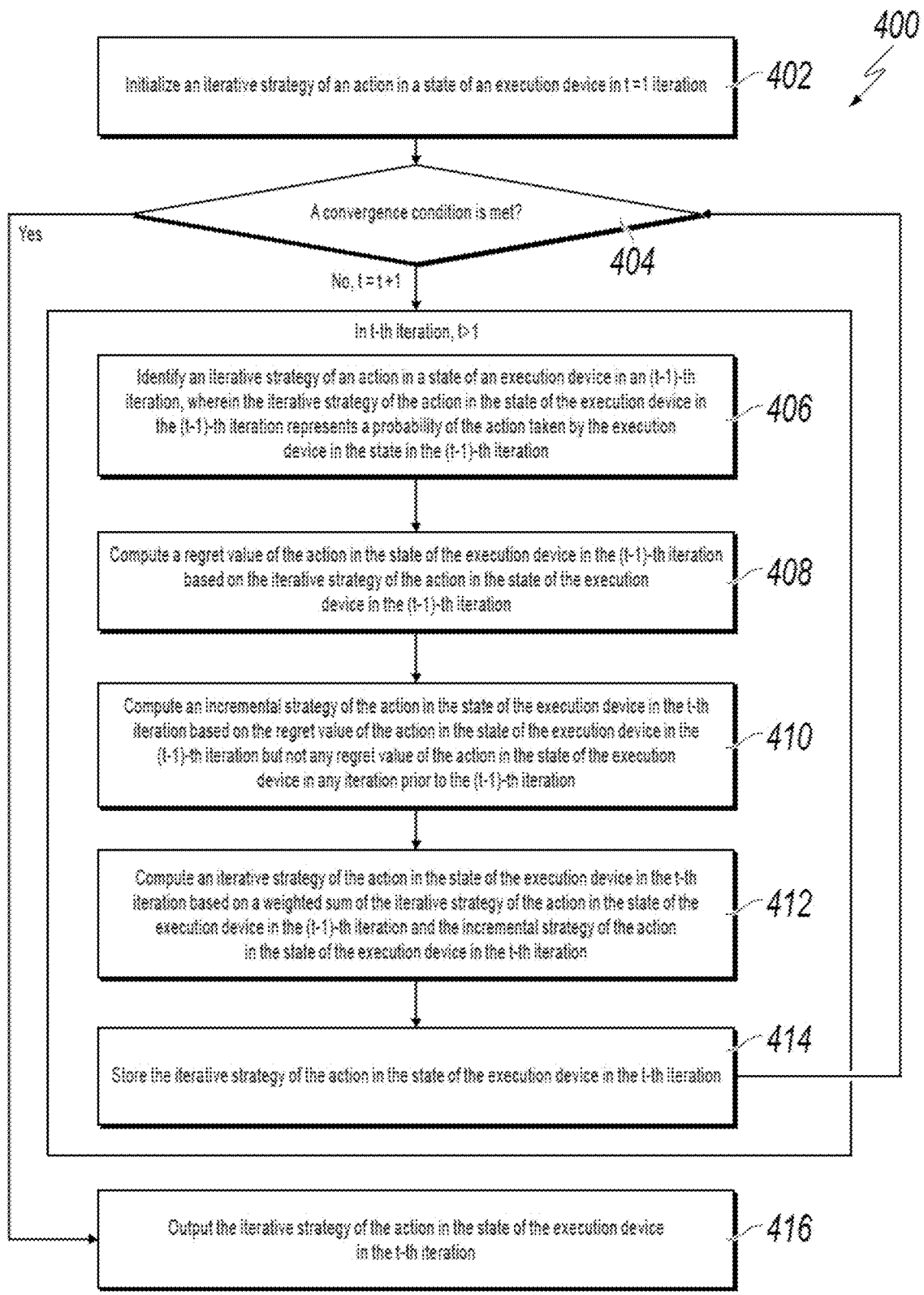
FIG. 4 is a flowchart of an example of a process for performing a streamline CFR for determining action selection policies for software applications, in accordance with embodiments of this specification.

FIG. 4 is a flowchart of an example of a process for performing a streamline counterfactual regret minimization (CFR) for determining action selection policies for software applications, in accordance with embodiments of this specification. The process 400 can be an example of the streamline CFR algorithm described above with respect to FIGS. 2-3. In some embodiments, the process 400 can be performed in an iterative manner, for example, by performing two or more iterations. In some embodiments, the process 400 can be used in automatic control, robotics, or any other applications that involve action selections. In some embodiments, the process 400 can be performed for generating an action selection policy (e.g., a strategy) for a software-implemented application that performs actions in an environment that includes an execution device supported by the application and one or more other devices. The action selection policy specifies a respective probability of selecting each of the plurality of possible actions. For example, the execution device can perform the process 400 in determining an action selection policy for the execution device and controlling operations of the execution device according to the action selection policy.

In some embodiments, the action selection policy in the environment that includes an execution device supported by the application and one or more other devices.

In some embodiments, the process 400 can be performed by an execution device for generating an action selection policy (e.g., a strategy) for completing a task (e.g., finding Nash equilibrium) in an environment that includes the execution device and one or more other devices. In some embodiments, the execution device can perform the process 400 in for controlling operations of the execution device according to the action selection policy.

In some embodiments, the execution device can include a data processing apparatus such as a system of one or more computers, located in one or more locations, and programmed appropriately in accordance with this specification. For example, a computer system 500 of FIG. 5, appropriately programmed, can perform the process 400. The execution device can be associated with an execution device or player. The execution device or player and one or more other parties (e.g., associated with the one or more other devices) can be participants or players in an environment, for example, for strategy searching in strategic interaction between the execution device and one or more other parties.

In some embodiments, the environment can be modeled by an imperfect information game (IIG) that involves two or more players. In some embodiments, the process 400 can be performed for solving an IIG, for example, by the execution device supported by the application. The IIG can represent one or more real-world scenarios such as resource allocation, product/service recommendation, cyber-attack prediction and/or prevention, traffic routing, fraud management, etc., that involve two or more parties, where each party may have incomplete or imperfect information about the other party's decisions. As an example, the IIG can represent a collaborative product-service recommendation service that involves at least a first player and a second player. The first player may be, for example, an online retailer that has customer (or user) information, product and service information, purchase history of the customers, etc. The second player can be, for example, a social network platform that has social networking data of the customers, a bank or another finical institution that has financial information of the customers, a car dealership, or any other parties that may have information of the customers on the customers' preferences, needs, financial situations, locations, etc. in predicting and recommendations of products and services to the customers. The first player and the second player may each have proprietary data that the player does not want to share with others. The second player may only provide partial information to the first player at different times. As such, the first player may only have limited access to information of the second player. In some embodiments, the process 400 can be performed for making a recommendation to a party with limited information of the second party, planning a route with limited information.

At 402, an iterative action selection policy (e.g., strategy) of an action in a state of a party (e.g., the execution device supported by the application) in a first iteration, i.e., t=1 iteration, is initialized. In some embodiments, the state of the execution device results from a history of actions taken by the party.

In some embodiments, the iterative strategy can be initialized, for example, based on an existing strategy, a uniform random strategy (e.g. a strategy based on a uniform probability distribution), or another strategy (e.g. a strategy based on a different probability distribution). For example, if the system warm starts from an existing CFR method (e.g., an original CFR or MCCFR method), the iterative strategy can be initialized from an existing strategy profile to clone existing regrets and strategy.

In some embodiments, the strategic interaction between two or more parties can be modeled by an imperfect information game (IIG). As an example, the IIG represents a collaborative product-service recommendation service that involves the party and a second party. The party has limited access to information of the second party. The state of the party comprises a history of information provided by the second party, and the action of the party comprises an action in response to the history of information provided by the second party for providing product-service recommendations to customers.

At 404, whether a convergence condition is met is determined. The convergence condition can be used for determining whether to continue or terminate the iteration. In some embodiments, the convergence condition can be based on exploitability of a strategy σ. According to the definition of exploitability, exploitability should be large than or equal with 0. The smaller exploitability indicates a better strategy. That is, the exploitability of converged strategy should approach 0 after enough iterations. For example, in poker, when the exploitability is less than 1, the time-average strategy is regarded as a good strategy and it is determined that the convergence condition is met. In some embodiments, the convergence condition can be based on a predetermined number of iterations. For example, in a small game, the iterations can be easily determined by the exploitability. That is, if exploitability is small enough, the process 400 can terminate. In a large game, the exploitability is intractable, typically a large parameter for iteration can be specified. After each iteration, a new strategy profile can be obtained, which is better than the old one. For example, in a large game, the process 400 can terminate after a sufficient number of iterations.

If the convergence condition is met, no further iteration is needed. The process 400 proceeds to 416, where an iterative strategy (the latest strategy in the current iteration) is outputted. If the convergence condition is not met, t is increased by 1, and the process 400 proceeds to a next iteration, wherein t>1.

In a current iteration (e.g., t-th iteration), at 406, an iterative strategy of an action in a state of a party in a previous iteration (e.g., an iterative strategy $\sigma_i^{t-1}(a|I_i)$ of an action a in a state of a party represented by an information set $I_i$ in a (t−1)-th iteration) is identified. The iterative strategy of the action in the state of the party in the (t−1)-th iteration represents a probability of the action taken by the party in the state in the (t−1)-th iteration.

At 408, a regret value of the action in the state of the party in the (t−1)-th iteration (e.g., $r_i^{\sigma^{t-1}}(a|I_i)$) is computed based on the iterative strategy of the action in the state of the party in the (t−1)-th iteration. In some embodiments, the regret value of the action in the state of the execution device represents a difference between a gain (e.g., a CFV) of the execution device after taking the action in the state and a gain of the execution device in the state. In some embodiments, the CFV can be computed by recursively traversing a game tree that represents the environment that includes the execution device supported by the application and the one or more other parties.

In some embodiments, computing a regret value of the action in the state of the party in the (t−1)-th iteration based on the iterative strategy of the action in the state of the party in the (t−1)-th iteration comprises computing the regret value of the action in the state of the party in the (t−1)-th iteration based on the iterative strategy of the action in the state of the party in the (t−1)-th iteration but not any regret value of the action in the state of the party in any iteration prior to the (t−1)-th iteration.

In some embodiments, computing a regret value of the action in the state of the party in the (t−1)-th iteration based on the iterative strategy of the action in the state of the party in the (t−1)-th iteration comprises computing the regret value of the action in the state of the party in the (t−1)-th iteration based on a difference between a counterfactual value of the action in the state of the party and a counterfactual value of the state of the party (e.g., according to Eq. (3)), wherein the counterfactual value of the action in the state of the party and the counterfactual value of the state of the party are computed by recursively traversing a game tree that represents the environment that includes the execution device supported by the application and the one or more other parties in the (t−1)-th iteration (e.g., as shown in lines 4-27 of the pseudocode 300 in FIG. 3).

At 410, an incremental strategy of the action in the state of the party in the t-th iteration (e.g., $\check{\sigma}_i^{t+1}(a|I_i)$) is computed based on the regret value of the action in the state of the party in the (t−1)-th iteration but not any regret value of the action in the state of the party in any iteration prior to the (t−1)-th iteration. In some embodiments, the incremental strategy of the action in the state of the party in the t-th iteration is computed based on the regret value of the action in the state of the party in the (t−1)-th iteration but not any regret value of the action in the state of the party in any iteration prior to the (t−1)-th iteration according to Eq. (8). For example, the incremental strategy of the action in the state of the party in the t-th iteration is computed based on the regret value of the action in the state of the party in the (t−1)-th iteration but not any regret value of the action in the state of the party in any iteration prior to the (t−1)-th iteration according to:

$$\breve{\sigma}_i^t(a|I_i) = \begin{cases} \dfrac{\breve{R}_i^{t-1,+}(a|I_i)}{\sum_{a\in A(I_i)} \breve{R}_i^{t-1,+}(a|I_i)} & \text{if } \sum_{a\in A(I_i)} \breve{R}_i^{t-1,+}(a|I_i) > 0 \\ \dfrac{1}{|A(I_i)|} & \text{otherwise} \end{cases}, \quad 5$$

wherein a represents the action, $I_i$ represents the state of the party, $\breve{\sigma}_i^t(a|I_i)$ represents the incremental strategy of the action in the state of the party in the t-th iteration, $\breve{R}^{t-1}(a|I_i) = r_i^{\sigma'}(a|I_i)$ represents the regret value of the action in the state of the party in the (t−1)-th iteration, $\breve{R}_i^{t-1,+}(a|I_i) = \max(\breve{R}_i^{t-1}(a|I_i), 0)$, and $|A(I_i)|$ represents a number of total available actions in the state of the party.

At 412, an iterative strategy of the action in the state of the party in the t-th iteration is computed based on a weighted sum of the iterative strategy of the action in the state of the party in the (t−1)-th iteration and the incremental strategy of the action in the state of the party in the t-th iteration. For example, the iterative strategy of the action in the state of the party in the t-th iteration is computed based on a weighted sum of the iterative strategy of the action in the state of the party in the (t−1)-th iteration and the incremental strategy of the action in the state of the party in the t-th iteration according to Eq. (9). In some embodiments, the weighted sum of the iterative strategy of the action in the state of the party in the (t−1)-th iteration and the incremental strategy of the action in the state of the party in the t-th iteration comprises a sum of the iterative strategy of the action in the state of the party in the (t−1)-th iteration scaled by a first learning rate in the t-th iteration and the incremental strategy of the action in the state of the party in the t-th iteration scaled by a second learning rate in the t-th iteration. The first learning rate approaches 1 as t approaches infinity, and the second learning rate approaches 0 as t approaches infinity. In some embodiments, the first learning rate is (t−1)/t, and the second learning rate is 1/t.

At 414, the iterative strategy of the action in the state of the party in the t-th iteration is stored, for example, for computing the iterative strategy of the action in the state of the party in the (t+1)-th iteration. In some embodiments, the iterative strategy of the action in the state of the party in the t-th iteration can be stored in a memory (e.g., in a table or another data structure in a memory) or another data store. In some embodiments, the iterative strategy of the action in the state of the party in the t-th iteration can be stored by a neutral network. For example, a neutral network can be used to learn the iterative strategy of the action in the state of the party in the t-th iteration, for example, for predicting the iterative strategy of the action in the state of the party in the (t+1)-th iteration. In some embodiments, compared to the original CFR, the streamline CFR algorithm only needs a half of the storage size or a single rather than double neutral network to track the key information while converging to comparable results produced by original CFR.

At 416, in response to determining that a convergence condition is met, the iterative strategy of the action in the state of the party in the t-th iteration is outputted. In some embodiments, the iterative strategy of the action in the state of the party in the t-th iteration can be used to approximate Nash equilibrium and serve as an output of the CFR algorithm. In some embodiments, the iterative strategy of the action in the state of the party can include a series of actions of the player in the real-world scenario modeled by the IIG. For example, in the collaborative product-service recommendation scenario, the iterative strategy of the action in the state of the party can include, for example, a series of actions in response to the information provided by the second player, corresponding product-service recommendations to customers based on the information of the first player and the information provided by the second player. The iterative strategy of the action in the state of the party can include other information in other real-world scenarios that are modeled by the IIG.

Figure 5:
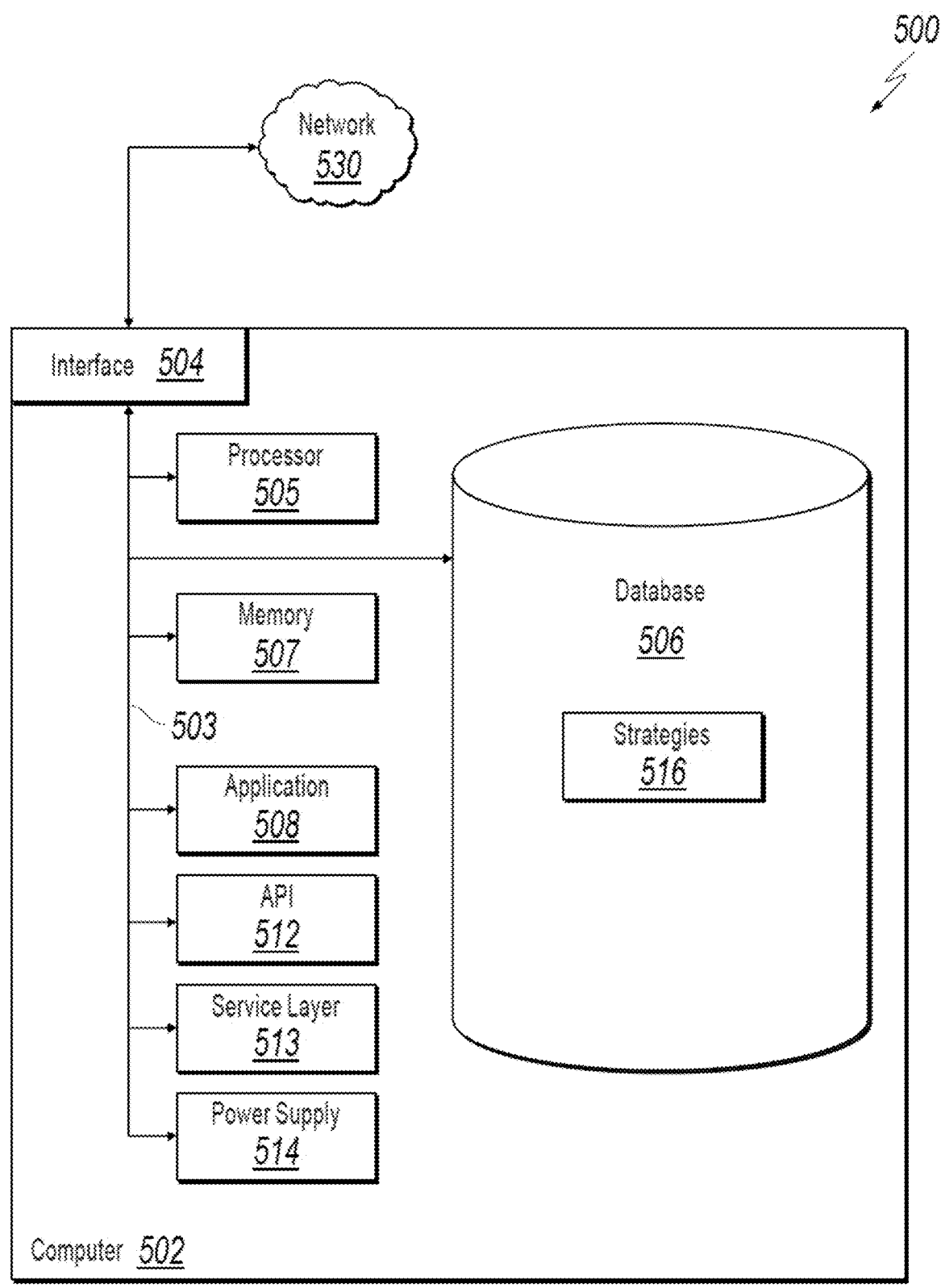
FIG. 5 depicts a block diagram illustrating an example of a computer-implemented system used to provide computational functionalities associated with described algorithms, methods, functions, processes, flows, and procedures, in accordance with embodiments of this specification.

FIG. 5 depicts a block diagram illustrating an example of a computer-implemented system 500 used to provide computational functionalities associated with described algorithms, methods, functions, processes, flows, and procedures in accordance with embodiments of this specification. FIG. 5 is a block diagram illustrating an example of a computer-implemented System 500 used to provide computational functionalities associated with described algorithms, methods, functions, processes, flows, and procedures, according to an embodiment of the present disclosure. In the illustrated embodiment, System 500 includes a Computer 502 and a Network 530.

The illustrated Computer 502 is intended to encompass any computing device such as a server, desktop computer, laptop/notebook computer, wireless data port, smart phone, personal data assistant (PDA), tablet computer, one or more processors within these devices, another computing device, or a combination of computing devices, including physical or virtual instances of the computing device, or a combination of physical or virtual instances of the computing device. Additionally, the Computer 502 can include an input device, such as a keypad, keyboard, touch screen, another input device, or a combination of input devices that can accept user information, and an output device that conveys information associated with the operation of the Computer 502, including digital data, visual, audio, another type of information, or a combination of types of information, on a graphical-type user interface (UI) (or GUI) or other UI.

The Computer 502 can serve in a role in a distributed computing system as a client, network component, a server, a database or another persistency, another role, or a combination of roles for performing the subject matter described in the present disclosure. The illustrated Computer 502 is communicably coupled with a Network 530. In some embodiments, one or more components of the Computer 502 can be configured to operate within an environment, including cloud-computing-based, local, global, another environment, or a combination of environments.

At a high level, the Computer 502 is an electronic computing device operable to receive, transmit, process, store, or manage data and information associated with the described subject matter. According to some embodiments, the Computer 502 can also include or be communicably coupled with a server, including an application server, e-mail server, web server, caching server, streaming data server, another server, or a combination of servers.

The Computer 502 can receive requests over Network 530 (for example, from a client software application executing on another Computer 502) and respond to the received requests by processing the received requests using a software application or a combination of software applications. In addition, requests can also be sent to the Computer 502 from internal users (for example, from a command console or by another internal access method), external or third-parties, or other entities, individuals, systems, or computers.

Each of the components of the Computer 502 can communicate using a System Bus 503. In some embodiments, any or all of the components of the Computer 502, including hardware, software, or a combination of hardware and software, can interface over the System Bus 503 using an application programming interface (API) 512, a Service Layer 513, or a combination of the API 512 and Service Layer 513. The API 512 can include specifications for routines, data structures, and object classes. The API 512 can be either computer-language independent or dependent and refer to a complete interface, a single function, or even a set of APIs. The Service Layer 513 provides software services to the Computer 502 or other components (whether illustrated or not) that are communicably coupled to the Computer 502. The functionality of the Computer 502 can be accessible for all service consumers using the Service Layer 513. Software services, such as those provided by the Service Layer 513, provide reusable, defined functionalities through a defined interface. For example, the interface can be software written in JAVA, C++, another computing language, or a combination of computing languages providing data in extensible markup language (XML) format, another format, or a combination of formats. While illustrated as an integrated component of the Computer 502, alternative embodiments can illustrate the API 512 or the Service Layer 513 as stand-alone components in relation to other components of the Computer 502 or other components (whether illustrated or not) that are communicably coupled to the Computer 502. Moreover, any or all parts of the API 512 or the Service Layer 513 can be implemented as a child or a sub-module of another software module, enterprise application, or hardware module without departing from the scope of the present disclosure.

The Computer 502 includes an Interface 504. Although illustrated as a single Interface 504, two or more Interfaces 504 can be used according to particular needs, desires, or particular embodiments of the Computer 502. The Interface 504 is used by the Computer 502 for communicating with another computing system (whether illustrated or not) that is communicatively linked to the Network 530 in a distributed environment. Generally, the Interface 504 is operable to communicate with the Network 530 and includes logic encoded in software, hardware, or a combination of software and hardware. More specifically, the Interface 504 can include software supporting one or more communication protocols associated with communications such that the Network 530 or hardware of Interface 504 is operable to communicate physical signals within and outside of the illustrated Computer 502.

The Computer 502 includes a Processor 505. Although illustrated as a single Processor 505, two or more Processors 505 can be used according to particular needs, desires, or particular embodiments of the Computer 502. Generally, the Processor 505 executes instructions and manipulates data to perform the operations of the Computer 502 and any algorithms, methods, functions, processes, flows, and procedures as described in the present disclosure.

The Computer 502 also includes a Database 506 that can hold data for the Computer 502, another component communicatively linked to the Network 530 (whether illustrated or not), or a combination of the Computer 502 and another component. For example, Database 506 can be an in-memory, conventional, or another type of database storing data consistent with the present disclosure. In some embodiments, Database 506 can be a combination of two or more different database types (for example, a hybrid in-memory and conventional database) according to particular needs, desires, or particular embodiments of the Computer 502 and the described functionality. Although illustrated as a single Database 506, two or more databases of similar or differing types can be used according to particular needs, desires, or particular embodiments of the Computer 502 and the described functionality. While Database 506 is illustrated as an integral component of the Computer 502, in alternative embodiments, Database 506 can be external to the Computer 502. As an example, Database 506 can include the above-described storage space 516 that stores iterative strategies for the streamline CFR algorithm.

The Computer 502 also includes a Memory 507 that can hold data for the Computer 502, another component or components communicatively linked to the Network 530 (whether illustrated or not), or a combination of the Computer 502 and another component. Memory 507 can store any data consistent with the present disclosure. In some embodiments, Memory 507 can be a combination of two or more different types of memory (for example, a combination of semiconductor and magnetic storage) according to particular needs, desires, or particular embodiments of the Computer 502 and the described functionality. Although illustrated as a single Memory 507, two or more Memories 507 or similar or differing types can be used according to particular needs, desires, or particular embodiments of the Computer 502 and the described functionality. While Memory 507 is illustrated as an integral component of the Computer 502, in alternative embodiments, Memory 507 can be external to the Computer 502.

The Application 508 is an algorithmic software engine providing functionality according to particular needs, desires, or particular embodiments of the Computer 502, particularly with respect to functionality described in the present disclosure. For example, Application 508 can serve as one or more components, modules, or applications. Further, although illustrated as a single Application 508, the Application 508 can be implemented as multiple Applications 508 on the Computer 502. In addition, although illustrated as integral to the Computer 502, in alternative embodiments, the Application 508 can be external to the Computer 502.

The Computer 502 can also include a Power Supply 514. The Power Supply 514 can include a rechargeable or non-rechargeable battery that can be configured to be either user- or non-user-replaceable. In some embodiments, the Power Supply 514 can include power-conversion or management circuits (including recharging, standby, or another power management functionality). In some embodiments, the Power Supply 514 can include a power plug to allow the Computer 502 to be plugged into a wall socket or another power source to, for example, power the Computer 502 or recharge a rechargeable battery.

There can be any number of Computers 502 associated with, or external to, a computer system containing Computer 502, each Computer 502 communicating over Network 530. Further, the term "client," "user," or other appropriate terminology can be used interchangeably, as appropriate, without departing from the scope of the present disclosure. Moreover, the present disclosure contemplates that many users can use one Computer 502, or that one user can use multiple computers 502.

Figure 6:
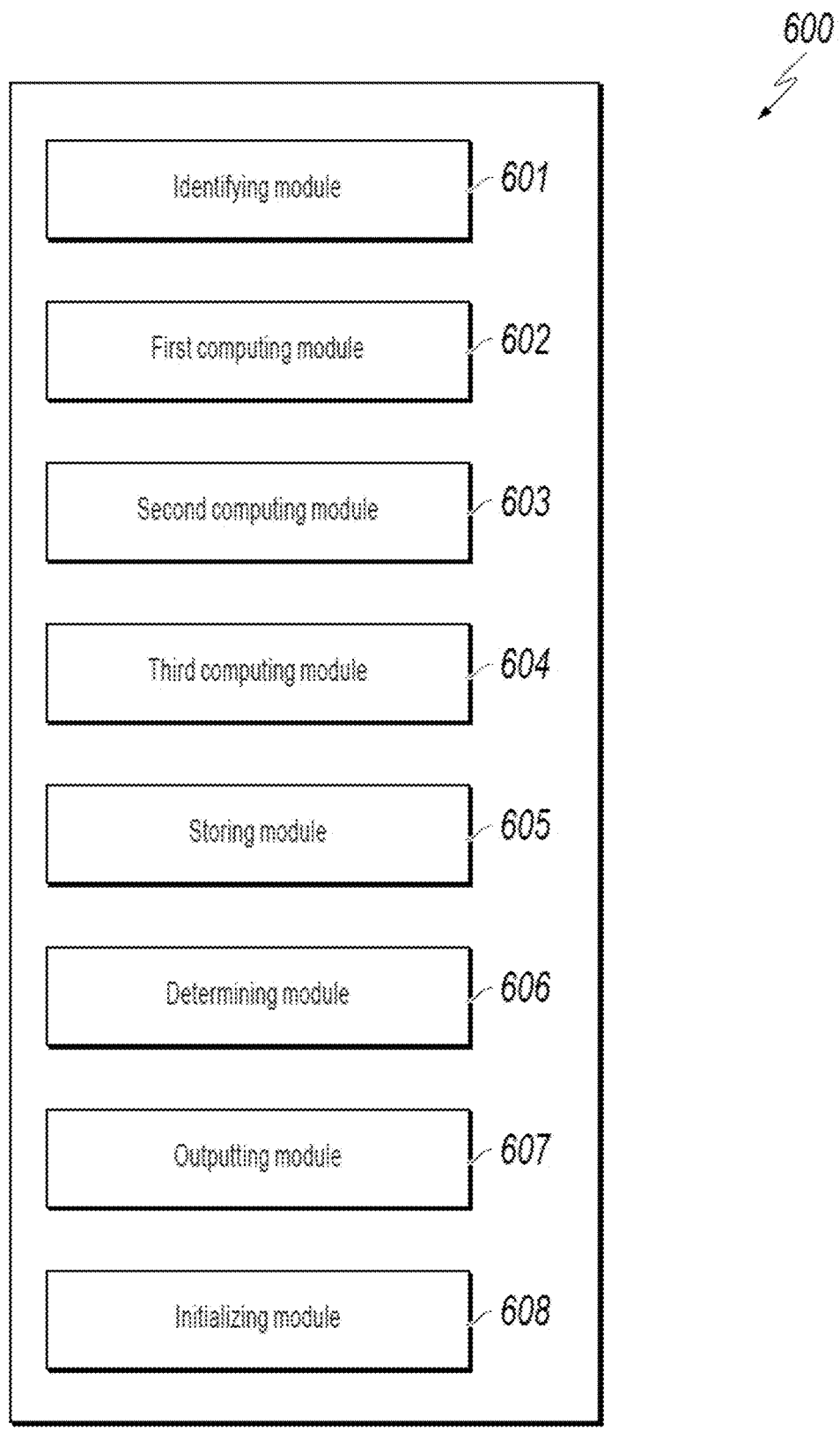
FIG. 6 is a diagram of an example of modules of an apparatus, in accordance with embodiments of this specification.

FIG. 6 is a diagram of an example of modules of an apparatus 600 in accordance with embodiments of this specification. In some embodiments, the apparatus 600 can generate an action selection policy for a software-implemented application that performs actions in an environment that includes an execution device supported by the application and one or more other parties. For example, the apparatus 600 can perform a computer-implemented method for a software-implemented application to generate a software-implemented application to generate an actionable output to perform in an environment, wherein the environment includes an application party supported by the application and one or more other parties. In some embodiments, the method represents the environment, possible actions of parties, and imperfect information available to the application about the other parties with data representing an imperfect information game (IIG), wherein the application determines the actionable output by performing a counterfactual regret minimization (CFR) for action selection policy searching in strategic interaction between the parties in an iterative manner, for example, by performing two or more iterations.

The apparatus 600 can correspond to the embodiments described above, and the apparatus 600 includes the following: an identifying module 601, at each of a plurality of iterations and for each action among a plurality of possible actions in a state of the execution device in a current iteration, wherein the state of the execution device results from a history of actions taken by the execution device, for identifying an iterative action selection policy of an action in a state of a party in a previous iteration, wherein the iterative action selection policy of the action in the state of the party in the previous iteration represents a probability of the action taken by the party in the state in the previous iteration; a first computing module 602 for computing a regret value of the action in the state of the party in the previous iteration based on the iterative action selection policy of the action in the state of the party in the previous iteration, wherein the regret value of the action in the state of the execution device represents a difference between a gain of the execution device after taking the action in the state and a gain of the execution device in the state; a second computing module 603 for computing an incremental action selection policy of the action in the state of the party in the current iteration based on the regret value of the action in the state of the party in the previous iteration but not any regret value of the action in the state of the party in any iteration prior to the previous iteration; a third computing module 604 for computing an iterative action selection policy of the action in the state of the party in the current iteration based on a weighted sum of the iterative action selection policy of the action in the state of the party in the previous iteration and the incremental action selection policy of the action in the state of the party in the current iteration; and a storage module 605 for storing the iterative action selection policy of the action in the state of the party in the current iteration.

In an optional embodiment, the IIG represents a collaborative product-service recommendation service that involves the party and a second party, wherein the party has limited access to information of the second party, wherein the state of the party comprises a history of information provided by the second party, and wherein the action of the party comprises an action in response to the history of information provided by the second party for providing product-service recommendations to customers.

In an optional embodiment, the apparatus 600 further includes: a determining module 606 for determining whether a convergence condition is met and an outputting module 607 for, in response to determining that a convergence condition is met, outputting the iterative action selection policy of the action in the state of the party in the current iteration.

In an optional embodiment, computing a regret value of the action in the state of the party in the previous iteration based on the iterative action selection policy of the action in the state of the party in the previous iteration comprises computing the regret value of the action in the state of the party in the previous iteration based on the iterative action selection policy of the action in the state of the party in the previous iteration but not any regret value of the action in the state of the party in any iteration prior to the previous iteration.

In an optional embodiment, computing a regret value of the action in the state of the party in the previous iteration based on the iterative action selection policy of the action in the state of the party in the previous iteration comprises computing the regret value of the action in the state of the party in the previous iteration based on a difference between a counterfactual value of the action in the state of the party and a counterfactual value of the state of the party, wherein the counterfactual value of the action in the state of the party and the counterfactual value of the state of the party are computed by recursively traversing a game tree that represents the environment that includes the execution device supported by the application and the one or more other parties in the previous iteration.

In an optional embodiment, the weighted sum of the iterative action selection policy of the action in the state of the party in the previous iteration and the incremental action selection policy of the action in the state of the party in the current iteration comprises a sum of the iterative action selection policy of the action in the state of the party in the previous iteration scaled by a first learning rate in the current iteration and the incremental action selection policy of the action in the state of the party in the current iteration scaled by a second learning rate in the current iteration, wherein the first learning rate approaches 1 as the number of iterations, t, approaches infinity, and the second learning rate approaches 0 as t approaches infinity.

In an optional embodiment, the first learning rate is (t−1)/t, and the second learning rate is 1/t.

In an optional embodiment, the incremental action selection policy of the action in the state of the party in the current iteration is computed based on the regret value of the action in the state of the party in the previous iteration but not any regret value of the action in the state of the party in any iteration prior to the previous iteration according to:

$$\check{\sigma}_i^t(a|I_i) = \begin{cases} \dfrac{\check{R}_i^{t-1,+}(a|I_i)}{\sum_{a \in A(I_i)} \check{R}_i^{t-1,+}(a|I_i)} & \text{if } \sum_{a \in A(I_i)} \check{R}_i^{t-1,+}(a|I_i) > 0 \\ \dfrac{1}{|A(I_i)|} & \text{otherwise} \end{cases},$$

wherein a represents the action, $I_i$ represents the state of the party, $\check{\sigma}_i^t(a|I_i)$ represents the incremental action selection policy of the action in the state of the party in the current iteration, $\check{R}_i^{t-1}(a|I_i) = r_i^{\sigma^t}(a|I_i)$ represents the regret value of the action in the state of the party in the previous iteration, $\check{R}_i^{t-1,+}(a|I_i) = \max(\check{R}_i^{t-1}(a|I_i), 0)$, and $|A(I_i)|$ represents a number of total available actions in the state of the party.

In an optional embodiment, the apparatus 600 further includes: an initializing module 608 for initializing the iterative action selection policy of the action in the state of the party in the first iteration based on a uniform random action selection policy.

The system, apparatus, module, or unit illustrated in the previous embodiments can be implemented by using a computer chip or an entity, or can be implemented by using a product having a certain function. A typical embodiment device is a computer, and the computer can be a personal computer, a laptop computer, a cellular phone, a camera phone, a smartphone, a personal digital assistant, a media player, a navigation device, an email receiving and sending device, a game console, a tablet computer, a wearable device, or any combination of these devices.

For an embodiment process of functions and roles of each module in the apparatus, references can be made to an embodiment process of corresponding steps in the previous method. Details are omitted here for simplicity.

Because an apparatus embodiment basically corresponds to a method embodiment, for related parts, references can be made to related descriptions in the method embodiment. The previously described apparatus embodiment is merely an example. The modules described as separate parts may or may not be physically separate, and parts displayed as modules may or may not be physical modules, may be located in one position, or may be distributed on a number of network modules. Some or all of the modules can be selected based on actual demands to achieve the objectives of the solutions of the specification. A person of ordinary skill in the art can understand and implement the embodiments of the present application without creative efforts.

Referring again to FIG. 6, it can be interpreted as illustrating an internal functional module and a structure of a data processing apparatus for generating an action selection policy for a software-implemented application that performs actions in an environment that includes an execution device supported by the application and one or more other parties. In some embodiments, the data processing apparatus can be used for performing counterfactual regret minimization (CFR) for action selection policy searching in strategic interaction between two or more players. In some embodiments, strategic interaction between two or more players can be modeled by an imperfect information game (IIG) that involves two or more players. In some embodiments, the data processing apparatus can perform a computer-implemented method for a software-implemented application to generate an actionable output to perform in an environment, wherein the environment includes an application party supported by the application and one or more other parties, the method representing the environment, possible actions of parties, and imperfect information available to the application about the other parties with data representing an imperfect information game (IIG), wherein the application determines the actionable output by performing a counterfactual regret minimization (CFR) for strategy searching in strategic interaction between the parties in an iterative manner. An execution body in essence can be an electronic device, and the electronic device includes the following: one or more processors and a memory configured to store an executable instruction of the one or more processors.

The one or more processors are configured to, at each of a plurality of iterations and for each action among a plurality of possible actions in a state of the execution device in a current iteration, wherein the state of the execution device results from a history of actions taken by the execution device, identify an iterative action selection policy of an action in a state of a party in a previous iteration, wherein the iterative action selection policy of the action in the state of the party in the previous iteration represents a probability of the action taken by the party in the state in the previous iteration; compute a regret value of the action in the state of the party in the previous iteration based on the iterative action selection policy of the action in the state of the party in the previous iteration, wherein the regret value of the action in the state of the execution device represents a difference between a gain of the execution device after taking the action in the state and a gain of the execution device in the state; compute an incremental action selection policy of the action in the state of the party in the current iteration based on the regret value of the action in the state of the party in the previous iteration but not any regret value of the action in the state of the party in any iteration prior to the previous iteration; compute an iterative action selection policy of the action in the state of the party in the current iteration based on a weighted sum of the iterative action selection policy of the action in the state of the party in the previous iteration and the incremental action selection policy of the action in the state of the party in the current iteration; and store the iterative action selection policy of the action in the state of the party in the current iteration.

Optionally, the IIG represents a collaborative product-service recommendation service that involves the party and a second party, wherein the party has limited access to information of the second party, wherein the state of the party comprises a history of information provided by the second party, and wherein the action of the party comprises an action in response to the history of information provided by the second party for providing product-service recommendations to customers.

Optionally, the one or more processors are configured to, in response to determining that a convergence condition is met, output the iterative action selection policy of the action in the state of the party in the current iteration.

Optionally, computing a regret value of the action in the state of the party in the previous iteration based on the iterative action selection policy of the action in the state of the party in the previous iteration comprises computing the regret value of the action in the state of the party in the previous iteration based on the iterative action selection policy of the action in the state of the party in the previous iteration but not any regret value of the action in the state of the party in any iteration prior to the previous iteration.

Optionally, computing a regret value of the action in the state of the party in the previous iteration based on the iterative action selection policy of the action in the state of the party in the previous iteration comprises computing the regret value of the action in the state of the party in the previous iteration based on a difference between a counterfactual value of the action in the state of the party and a counterfactual value of the state of the party, wherein the counterfactual value of the action in the state of the party and the counterfactual value of the state of the party are computed by recursively traversing a game tree that represents the environment that includes the execution device supported by the application and the one or more other parties in the previous iteration.

Optionally, the weighted sum of the iterative action selection policy of the action in the state of the party in the previous iteration and the incremental action selection policy of the action in the state of the party in the current iteration comprises a sum of: the iterative action selection policy of the action in the state of the party in the previous iteration scaled by a first learning rate in the current iteration and the incremental action selection policy of the action in the state of the party in the current iteration scaled by a second learning rate in the current iteration, wherein the first learning rate approaches 1 as the number of iterations, t, approaches infinity, and the second learning rate approaches 0 as t approaches infinity.

Optionally, the first learning rate is (t−1)/t, and the second learning rate is 1/t.

Optionally, the incremental action selection policy of the action in the state of the party in the current iteration is computed based on the regret value of the action in the state of the party in the previous iteration but not any regret value of the action in the state of the party in any iteration prior to the previous iteration according to:

$$\check{\sigma}_i^t(a|I_i) = \begin{cases} \dfrac{\check{R}_i^{t-1,+}(a|I_i)}{\sum_{a \in A(I_i)} \check{R}_i^{t-1,+}(a|I_i)} & \text{if } \sum_{a \in A(I_i)} \check{R}_i^{t-1,+}(a|I_i) > 0 \\ \dfrac{1}{|A(I_i)|} & \text{otherwise} \end{cases},$$

wherein a represents the action, $I_i$ represents the state of the party, $\check{\sigma}(a|I_i)$ represents the incremental action selection policy of the action in the state of the party in the current iteration, $\check{R}_i^{t-1}(a|I_i) = r_i^{\sigma^t}(a|I_i)$ represents the regret value of the action in the state of the party in the previous iteration, $\check{R}_i^{t-1,+}(a|I_i) = \max(\check{R}_i^{t-1}(a|I_i), 0)$, and $|A(I_i)|$ represents a number of total available actions in the state of the party.

Optionally, the one or more processors are configured to initialize the iterative action selection policy of the action in the state of the party in the first iteration based on a uniform random action selection policy.

The techniques described in this specification produce one or more technical effects. In some embodiments, the described techniques can be performed by an execution device for generating an action selection policy for completing a task in an environment that includes the execution device and one or more other devices. In some embodiments, the described techniques can determine an action selection policy for a software-implemented application that performs actions in an environment that includes an execution device supported by the application and one or more other parties. In some embodiments, the described techniques can be used in automatic control, robotics, or any other applications that involve action selections.

In some embodiments, the described sampling techniques can help find better strategies of real-world scenarios such as resource allocation, product/service recommendation, cyber-attack prediction and/or prevention, traffic routing, fraud management, etc. that can be modeled or represented by strategic interaction between parties, such as, an IIG that involves two or more parties in a more efficient manner. In some embodiments, the described techniques can improve the convergence speed of counterfactual regret minimization (CFR) algorithm in finding Nash equilibrium for solving a game that represents one or more real-world scenarios. In some embodiments, the described techniques can improve computational efficiency and reduce the computational load of the CFR algorithm in finding the best strategies of the real-world scenarios modeled by the IIG, for example, by using an incremental action selection policy, rather than an accumulative regret or average action selection policy in updating the action selection policy and regret values for each iteration of the CFR algorithm. In some embodiments, the described techniques save memory space and provide faster convergence by. In some embodiments, the described techniques may only half of the amount of memory space required by the existing CFR algorithm while converging to comparable results produced by the original CFR. The disclosed streamline CFR algorithm can be used in large games even with memory constraints.

Described embodiments of the subject matter can include one or more features, alone or in combination.

For example, in a first embodiment, a computer-implemented method for a software-implemented application to generate an actionable output to perform in an environment, wherein the environment includes an application party supported by the application and one or more other parties, the method representing the environment, possible actions of parties, and imperfect information available to the application about the other parties with data representing an imperfect information game (IIG), wherein the application determines the actionable output by performing a counterfactual regret minimization (CFR) for strategy searching in strategic interaction between the parties in an iterative manner, wherein performing the CFR includes: performing two or more iterations; and in a t-th iteration, wherein t>1; identifying an iterative strategy of an action in a state of a party in an (t−1)-th iteration, wherein the iterative strategy of the action in the state of the party in the (t−1)-th iteration represents a probability of the action taken by the party in the state in the (t−1)-th iteration; computing a regret value of the action in the state of the party in the (t−1)-th iteration based on the iterative strategy of the action in the state of the party in the (t−1)-th iteration; computing an incremental strategy of the action in the state of the party in the t-th iteration based on the regret value of the action in the state of the party in the (t−1)-th iteration but not any regret value of the action in the state of the party in any iteration prior to the (t−1)-th iteration; computing an iterative strategy of the action in the state of the party in the t-th iteration based on a weighted sum of the iterative strategy of the action in the state of the party in the (t−1)-th iteration and the incremental strategy of the action in the state of the party in the t-th iteration; and storing the iterative strategy of the action in the state of the party in the t-th iteration.

In a second embodiment, a computer-implemented method of an execution device for generating an action selection policy for completing a task in an environment that includes the execution device and one or more other devices, the method comprising: at each of a plurality of iterations and for each action among a plurality of possible actions in a state of the execution device in a current iteration, wherein the state of the execution device results from a history of actions taken by the execution device, identifying an iterative action selection policy of the action in the state of the execution device in a previous iteration, wherein the iterative action selection policy of the action in the state of the execution device in the previous iteration represents a probability of the action taken by the execution device in the state in the previous iteration; computing a regret value of the action in the state of the execution device in the previous iteration based on the iterative action selection policy of the action in the state of the execution device in the previous iteration, wherein the regret value of the action in the state of the execution device represents a difference between a gain of the execution device after taking the action in the state and a gain of the execution device in the state; computing an incremental action selection policy of the action in the state of the execution device in the current iteration based on the regret value of the action in the state of the execution device in the previous iteration but not any regret value of the action in the state of the execution device in any iteration prior to the previous iteration; computing an iterative action selection policy of the action in the state of the execution device in the current iteration based on a weighted sum of the iterative action selection policy of the action in the state of the execution device in the previous iteration and the incremental action selection policy of the action in the state of the execution device in the current iteration; and storing the iterative action selection policy of the action in the state of the execution device in the current iteration.

The foregoing and other described embodiments can each, optionally, include one or more of the following features:

A first feature, combinable with any of the following features, wherein the IIG represents a collaborative product-service recommendation service that involves the party and a second party, wherein the party has limited access to information of the second party, wherein the state of the party comprises a history of information provided by the second party, and wherein the action of the party comprises an action in response to the history of information provided by the second party for providing product-service recommendations to customers.

A second feature, combinable with any of the following features, further including: in response to determining that a convergence condition is met, outputting the iterative action selection policy of the action in the state of the party in the current iteration.

A third feature, combinable with any of the following features, wherein computing a regret value of the action in the state of the party in the previous iteration based on the iterative action selection policy of the action in the state of the party in the previous iteration comprises computing the regret value of the action in the state of the party in the previous iteration based on the iterative action selection policy of the action in the state of the party in the previous iteration but not any regret value of the action in the state of the party in any iteration prior to the previous iteration.

A fourth feature, combinable with any of the following features, wherein computing a regret value of the action in the state of the party in the previous iteration based on the iterative action selection policy of the action in the state of the party in the previous iteration comprises computing the regret value of the action in the state of the party in the previous iteration based on a difference between a counterfactual value of the action in the state of the party and a counterfactual value of the state of the party, wherein the counterfactual value of the action in the state of the party and the counterfactual value of the state of the party are computed by recursively traversing a game tree that represents the environment that includes the execution device supported by the application and the one or more other parties in the previous iteration.

A fifth feature, combinable with any of the following features, wherein the weighted sum of the iterative action selection policy of the action in the state of the party in the previous iteration and the incremental action selection policy of the action in the state of the party in the current iteration comprises a sum of: the iterative action selection policy of the action in the state of the party in the previous iteration scaled by a first learning rate in the current iteration; and the incremental action selection policy of the action in the state of the party in the current iteration scaled by a second learning rate in the current iteration, and wherein the first learning rate approaches 1 as the number of iterations, t, approaches infinity, and the second learning rate approaches 0 as t approaches infinity.

A sixth feature, combinable with any of the following features, wherein the first learning rate is $(t-1)/t$, and the second learning rate is $1/t$.

A seventh feature, combinable with any of the following features, the incremental action selection policy of the action in the state of the party in the current iteration is computed based on the regret value of the action in the state of the party in the previous iteration but not any regret value of the action in the state of the party in any iteration prior to the previous iteration according to:

$$\check{\sigma}_i^t(a|I_i) = \begin{cases} \dfrac{\check{R}_i^{t-1,+}(a|I_i)}{\sum_{a \in A(I_i)} \check{R}_i^{t-1,+}(a|I_i)} & \text{if } \sum_{a \in A(I_i)} \check{R}_i^{t-1,+}(a|I_i) > 0 \\ \dfrac{1}{|A(I_i)|} & \text{otherwise} \end{cases},$$

wherein a represents the action, $I_i$ represents the state of the party, $\check{\sigma}_i^t(a|I_i)$ represents the incremental action selection policy of the action in the state of the party in the current iteration, $\check{R}_i^{t-1}(a|I_i) = r_i^{\sigma'}(a|I_i)$ represents the regret value of the action in the state of the party in the previous iteration, $\check{R}_i^{t-1,+}(a|I_i)$ max$(\check{R}_i^{t-1}(a|I_i),0)$, and $|A(I_i)|$ represents a number of total available actions in the state of the party.

An eighth feature, combinable with any of the following features, further including: initializing the iterative action selection policy of the action in the state of the party in the first iteration based on a uniform random action selection policy.

A ninth feature, combinable with any of the following features, further comprising, in response to determining that a convergence condition is met, controlling operations of the execution device according to the iterative action selection policy of the action in the state of the execution device in the current iteration.

Embodiments of the subject matter and the actions and operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, e.g., one or more modules of computer program instructions, encoded on a computer program carrier, for execution by, or to control the operation of, data processing apparatus. For example, a computer program carrier can include one or more computer-readable storage media that have instructions encoded or stored thereon. The carrier may be a tangible non-transitory computer-readable medium, such as a magnetic, magneto optical, or optical disk, a solid state drive, a random access memory (RAM), a read-only memory (ROM), or other types of media. Alternatively, or in addition, the carrier may be an artificially generated propagated signal, e.g., a machine-generated electrical, optical, or electromagnetic signal that is generated to encode information for transmission to suitable receiver apparatus for execution by a data processing apparatus. The computer storage medium can be or be part of a machine-readable storage device, a machine-readable storage substrate, a random or serial access memory device, or a combination of one or more of them. A computer storage medium is not a propagated signal.

A computer program, which may also be referred to or described as a program, software, a software application, an app, a module, a software module, an engine, a script, or code, can be written in any form of programming language, including compiled or interpreted languages, or declarative or procedural languages; and it can be deployed in any form, including as a stand-alone program or as a module, component, engine, subroutine, or other unit suitable for executing in a computing environment, which environment may include one or more computers interconnected by a data communication network in one or more locations.

A computer program may, but need not, correspond to a file in a file system. A computer program can be stored in a portion of a file that holds other programs or data, e.g., one or more scripts stored in a markup language document, in a single file dedicated to the program in question, or in multiple coordinated files, e.g., files that store one or more modules, sub programs, or portions of code.

Processors for execution of a computer program include, by way of example, both general- and special-purpose microprocessors, and any one or more processors of any kind of digital computer. Generally, a processor will receive the instructions of the computer program for execution as well as data from a non-transitory computer-readable medium coupled to the processor.

The term "data processing apparatus" encompasses all kinds of apparatuses, devices, and machines for processing data, including by way of example a programmable processor, a computer, or multiple processors or computers. Data processing apparatus can include special-purpose logic circuitry, e.g., an FPGA (field programmable gate array), an ASIC (application specific integrated circuit), or a GPU (graphics processing unit). The apparatus can also include, in addition to hardware, code that creates an execution environment for computer programs, e.g., code that constitutes processor firmware, a protocol stack, a database management system, an operating system, or a combination of one or more of them.

The processes and logic flows described in this specification can be performed by one or more computers or processors executing one or more computer programs to perform operations by operating on input data and generating output. The processes and logic flows can also be performed by special-purpose logic circuitry, e.g., an FPGA, an ASIC, or a GPU, or by a combination of special-purpose logic circuitry and one or more programmed computers.

Computers suitable for the execution of a computer program can be based on general or special-purpose microprocessors or both, or any other kind of central processing unit. Generally, a central processing unit will receive instructions and data from a read only memory or a random access memory or both. Elements of a computer can include a central processing unit for executing instructions and one or more memory devices for storing instructions and data. The central processing unit and the memory can be supplemented by, or incorporated in, special-purpose logic circuitry.

Generally, a computer will also include, or be operatively coupled to receive data from or transfer data to one or more storage devices. The storage devices can be, for example, magnetic, magneto optical, or optical disks, solid state drives, or any other type of non-transitory, computer-readable media. However, a computer need not have such devices. Thus, a computer may be coupled to one or more storage devices, such as, one or more memories, that are local and/or remote. For example, a computer can include one or more local memories that are integral components of the computer, or the computer can be coupled to one or more remote memories that are in a cloud network. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Components can be "coupled to" each other by being commutatively such as electrically or optically connected to one another, either directly or via one or more intermediate components. Components can also be "coupled to" each other if one of the components is integrated into the other. For example, a storage component that is integrated into a processor (e.g., an L2 cache component) is "coupled to" the processor.

To provide for interaction with a user, embodiments of the subject matter described in this specification can be implemented on, or configured to communicate with, a computer having a display device, e.g., a LCD (liquid crystal display) monitor, for displaying information to the user, and an input device by which the user can provide input to the computer, e.g., a keyboard and a pointing device, e.g., a mouse, a trackball or touchpad. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser, or by interacting with an app running on a user device, e.g., a smartphone or electronic tablet. Also, a computer can interact with a user by sending text messages or other forms of message to a personal device, e.g., a smartphone that is running a messaging application, and receiving responsive messages from the user in return.

This specification uses the term "configured to" in connection with systems, apparatus, and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions. For special-purpose logic circuitry to be configured to perform particular operations or actions means that the circuitry has electronic logic that performs the operations or actions.

While this specification contains many specific embodiment details, these should not be construed as limitations on the scope of what is being claimed, which is defined by the claims themselves, but rather as descriptions of features that may be specific to particular embodiments. Certain features that are described in this specification in the context of separate embodiments can also be realized in combination in a single embodiment. Conversely, various features that are described in the context of a single embodiments can also be realized in multiple embodiments separately or in any suitable subcombination. Moreover, although features may be described above as acting in certain combinations and even initially be claimed as such, one or more features from a claimed combination can in some cases be excised from the combination, and the claim may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method of an execution device for generating an action selection policy for completing a task in an environment that includes the execution device and one or more other devices, the method comprising:

at each of a plurality of iterations and for each action among a plurality of possible actions in a state of the execution device in a current iteration, wherein the state of the execution device results from a history of actions taken by the execution device towards completing the task, identifying an iterative action selection policy of the action in the state of the execution device in a previous iteration, wherein the iterative action selection policy of the action in the state of the execution device in the previous iteration represents a probability of the action taken by the execution device in the state in the previous iteration;

computing a regret value of the action in the state of the execution device in the previous iteration based on the iterative action selection policy of the action in the state of the execution device in the previous iteration, wherein the regret value of the action in the state of the execution device represents a difference between a gain of the execution device attributed to the action towards completing the task after taking the action in the state and a gain of the execution device in the state attributed to the state towards completing the task;

computing an incremental action selection policy of the action in the state of the execution device in the current iteration based on the regret value of the action in the state of the execution device in the previous iteration but not any regret value of the action in the state of the execution device in any iteration prior to the previous iteration;

computing an iterative action selection policy of the action in the state of the execution device in the current iteration based on a weighted sum of the iterative action selection policy of the action in the state of the execution device in the previous iteration and the incremental action selection policy of the action in the state of the execution device in the current iteration;

storing the iterative action selection policy of the action in the state of the execution device in the current iteration; and in response to determining that a convergence condition is met, outputting the iterative action selection policy of the action in the state of the execution device in the current iteration such that operations of the execution device are controlled according to the iterative action selection policy of the action in the state of the execution device in the current iteration for completing the task.

2. The method of claim 1, further comprising, in response to determining that the convergence condition is met, controlling the operations of the execution device according to the iterative action selection policy of the action in the state of the execution device in the current iteration for completing the task.

3. The method of claim 1, wherein computing a regret value of the action in the state of the execution device in the previous iteration based on the iterative action selection policy of the action in the state of the execution device in the previous iteration comprises computing the regret value of the action in the state of the execution device in the previous iteration based on the iterative action selection policy of the action in the state of the execution device in the previous iteration but not any regret value of the action in the state of the execution device in any iteration prior to the previous iteration.

4. The method of claim 1, wherein computing a regret value of the action in the state of the execution device in the previous iteration based on the iterative action selection policy of the action in the state of the execution device in the previous iteration comprises computing the regret value of the action in the state of the execution device in the previous iteration based on a difference between a counterfactual value of the action in the state of the execution device and a counterfactual value of the state of the execution device, wherein the counterfactual value of the action in the state of the execution device and the counterfactual value of the state of the execution device are computed by recursively traversing a game tree that represents the environment that includes the execution device and the one or more other devices in the previous iteration.

5. The method of claim 1, wherein the weighted sum of the iterative action selection policy of the action in the state of the execution device in the previous iteration and the incremental action selection policy of the action in the state of the execution device in the current iteration comprises a sum of:

the iterative action selection policy of the action in the state of the execution device in the previous iteration scaled by a first learning rate in the current iteration; and the incremental action selection policy of the action in the state of the execution device in the current iteration scaled by a second learning rate in the current iteration, and wherein the first learning rate approaches 1 as the number of iterations, t, approaches infinity, and the second learning rate approaches 0 as t approaches infinity.

6. The method of claim 5, wherein the first learning rate is $(t-1)/t$, and the second learning rate is $1/t$.

7. The method of claim 1, further comprising initializing the iterative action selection policy of the action in the state of the execution device in the first iteration based on a uniform random action selection policy.

8. A system for generating an action selection policy for completing a task in an environment that includes an execution device and one or more other devices, the system comprising:
  one or more processors; and
  one or more computer-readable memories coupled to the one or more processors and having instructions stored thereon that are executable by the one or more processors to perform operations comprising:
    at each of a plurality of iterations and for each action among a plurality of possible actions in a state of the execution device in a current iteration, wherein the state of the execution device results from a history of actions taken by the execution device,
      identifying an iterative action selection policy of the action in the state of the execution device in a previous iteration, wherein the iterative action selection policy of the action in the state of the execution device in the previous iteration represents a probability of the action taken by the execution device in the state in the previous iteration;
      computing a regret value of the action in the state of the execution device in the previous iteration based on the iterative action selection policy of the action in the state of the execution device in the previous iteration, wherein the regret value of the action in the state of the execution device represents a difference between a gain of the execution device attributed to the action towards completing the task after taking the action in the state and a gain of the execution device in the state attributed to the state towards completing the task;
      computing an incremental action selection policy of the action in the state of the execution device in the current iteration based on the regret value of the action in the state of the execution device in the previous iteration but not any regret value of the action in the state of the execution device in any iteration prior to the previous iteration;
      computing an iterative action selection policy of the action in the state of the execution device in the current iteration based on a weighted sum of the iterative action selection policy of the action in the previous state of the execution device in the previous iteration and the incremental action selection policy of the action in the state of the execution device in the current iteration;
      storing the iterative action selection policy of the action in the state of the execution device in the current iteration; and
    in response to determining that a convergence condition is met, outputting the iterative action selection policy of the action in the state of the execution device in the current iteration such that operations of the execution device are controlled according to the iterative action selection policy of the action in the state of the execution device in the current iteration for completing the task.

9. The system of claim 8, the operations further comprising, in response to determining that the convergence condition is met, controlling the operations of the execution device according to the iterative action selection policy of the action in the state of the execution device in the current iteration for completing the task.

10. The system of claim 8, wherein computing a regret value of the action in the state of the execution device in the previous iteration based on the iterative action selection policy of the action in the state of the execution device in the previous iteration comprises computing the regret value of the action in the state of the execution device in the previous iteration based on the iterative action selection policy of the action in the state of the execution device in the previous iteration but not any regret value of the action in the state of the execution device in any iteration prior to the previous iteration.

11. The system of claim 8, wherein computing a regret value of the action in the state of the execution device in the previous iteration based on the iterative action selection policy of the action in the state of the execution device in the previous iteration comprises computing the regret value of the action in the state of the execution device in the previous iteration based on a difference between a counterfactual value of the action in the state of the execution device and a counterfactual value of the state of the execution device, wherein the counterfactual value of the action in the state of the execution device and the counterfactual value of the state of the execution device are computed by recursively traversing a game tree that represents the environment that includes the execution device and the one or more other devices in the previous iteration.

12. The system of claim 8, wherein the weighted sum of the iterative action selection policy of the action in the state of the execution device in the previous iteration and the incremental action selection policy of the action in the state of the execution device in the current iteration comprises a sum of:
  the iterative action selection policy of the action in the state of the execution device in the previous iteration scaled by a first learning rate in the current iteration; and
  the incremental action selection policy of the action in the state of the execution device in the current iteration scaled by a second learning rate in the current iteration, and
  wherein the first learning rate approaches 1 as the number of iterations, t, approaches infinity, and the second learning rate approaches 0 as t approaches infinity.

13. The system of claim 12, wherein the first learning rate is $(t-1)/t$, and the second learning rate is $1/t$.

14. The system of claim 8, the operations further comprising initializing the iterative action selection policy of the action in the state of the execution device in the first iteration based on a uniform random action selection policy.

15. A non-transitory, computer-readable storage medium storing one or more instructions executable by a computer system to perform operations for generating an action selection policy for completing a task in an environment that includes an execution device and one or more other devices, the operations comprising:
  at each of a plurality of iterations and for each action among a plurality of possible actions in a state of the execution device in a current iteration, wherein the state of the execution device results from a history of actions taken by the execution device,
    identifying an iterative action selection policy of the action in the state of the execution device in a previous iteration, wherein the iterative action selection policy of the action in the state of the execution device in the previous iteration represents a probability of the action taken by the execution device in the state in the previous iteration;
    computing a regret value of the action in the state of the execution device in the previous iteration based on the iterative action selection policy of the action in the state of the execution device in the previous iteration, wherein the regret value of the action in the state of the execution device represents a difference between a gain of the execution device attributed to the action towards completing the task after taking the action in the state and a gain of the execution device in the state attributed to the state towards completing the task;

computing an incremental action selection policy of the action in the state of the execution device in the current iteration based on the regret value of the action in the state of the execution device in the previous iteration but not any regret value of the action in the state of the execution device in any iteration prior to the previous iteration;

computing an iterative action selection policy of the action in the state of the execution device in the current iteration based on a weighted sum of the iterative action selection policy of the action in the state of the execution device in the previous iteration and the incremental action selection policy of the action in the state of the execution device in the current iteration;

storing the iterative action selection policy of the action in the state of the execution device in the current iteration; and in response to determining that a convergence condition is met, outputting the iterative action selection policy of the action in the state of the execution device in the current iteration such that operations of the execution device are controlled according to the iterative action selection policy of the action in the state of the execution device in the current iteration for completing the task.

16. The non-transitory, computer-readable storage medium of claim 15, the operations further comprising, in response to determining that the convergence condition is met, controlling the operations of the execution device according to the iterative action selection policy of the action in the state of the execution device in the current iteration for completing the task.

17. The non-transitory, computer-readable storage medium of claim 15, wherein computing a regret value of the action in the state of the execution device in the previous iteration based on the iterative action selection policy of the action in the state of the execution device in the previous iteration comprises computing the regret value of the action in the state of the execution device in the previous iteration based on the iterative action selection policy of the action in the state of the execution device in the previous iteration but not any regret value of the action in the state of the execution device in any iteration prior to the previous iteration.

18. The non-transitory, computer-readable storage medium of claim 15, wherein computing a regret value of the action in the state of the execution device in the previous iteration based on the iterative action selection policy of the action in the state of the execution device in the previous iteration comprises computing the regret value of the action in the state of the execution device in the previous iteration based on a difference between a counterfactual value of the action in the state of the execution device and a counterfactual value of the state of the execution device, wherein the counterfactual value of the action in the state of the execution device and the counterfactual value of the state of the execution device are computed by recursively traversing a game tree that represents the environment that includes the execution device and the one or more other devices in the previous iteration.

19. The non-transitory, computer-readable storage medium of claim 15, wherein the weighted sum of the iterative action selection policy of the action in the state of the execution device in the previous iteration and the incremental action selection policy of the action in the state of the execution device in the current iteration comprises a sum of:

the iterative action selection policy of the action in the state of the execution device in the previous iteration scaled by a first learning rate in the current iteration; and the incremental action selection policy of the action in the state of the execution device in the current iteration scaled by a second learning rate in the current iteration, and wherein the first learning rate approaches 1 as the number of iterations, t, approaches infinity, and the second learning rate approaches 0 as t approaches infinity.

20. The non-transitory, computer-readable storage medium of claim 19, wherein the first learning rate is $(t-1)/t$, and the second learning rate is $1/t$.

21. The non-transitory, computer-readable storage medium of claim 15, the operations further comprising initializing the iterative action selection policy of the action in the state of the execution device in the first iteration based on a uniform random action selection policy.

\* \* \* \* \*